(12) United States Patent
Hikichi et al.

(10) Patent No.: US 9,160,660 B2
(45) Date of Patent: Oct. 13, 2015

(54) ROUTER APPARATUS, COMMUNICATION SYSTEM AND PACKET TRANSFER METHOD

(71) Applicant: FUJITSU LIMITED, Kawasaki-shi, Kanagawa (JP)

(72) Inventors: Kenji Hikichi, Kawasaki (JP); Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 13/903,473

(22) Filed: May 28, 2013

(65) Prior Publication Data

US 2014/0016640 A1 Jan. 16, 2014

(30) Foreign Application Priority Data

Jul. 10, 2012 (JP) ................................. 2012-154591

(51) Int. Cl.
*H04L 12/741* (2013.01)
(52) U.S. Cl.
CPC ............. *H04L 45/74* (2013.01); *H04L 2212/00* (2013.01)
(58) Field of Classification Search
CPC ......... H04L 12/74; H04L 12/56; H04L 12/28; H04L 12/66; H04L 12/4633; H04L 45/74; H04W 40/00; G06F 15/173
USPC .................. 370/230, 331, 338, 389, 392, 401; 709/222, 223, 238
See application file for complete search history.

(56) References Cited

U.S. PATENT DOCUMENTS

2011/0075667 A1* 3/2011 Li et al. ........................... 370/392
2012/0198045 A1* 8/2012 Sakata et al. .................. 709/223

FOREIGN PATENT DOCUMENTS

JP 10-84385 3/1998
JP 2003-234752 8/2003

OTHER PUBLICATIONS

P. Mockapetris, Domain Names—Concepts and Facilities; Network Working Group, Request for Comments: 1034, Obsoletes: RFCs 882, 883, 973, pp. 1-55, Nov. 1987.
K. Egevang, et al., The IP Network Address Translator (NAT); Network Working Group, Request for Comments: 1631, Category: Informational, pp. 1-10, May 1994.

* cited by examiner

*Primary Examiner* — Jamal Javaid
*Assistant Examiner* — Wali Butt
(74) *Attorney, Agent, or Firm* — Fujitsu Patent Center

(57) ABSTRACT

A router apparatus connecting a first network and a second network including a storage unit which stores association information associating an address of one of a plurality of second router apparatuses with an address of a corresponding one of a plurality of server apparatuses with an identical address, each of the plurality of second router apparatus connecting the first network to each of a plurality of third networks to which the respective plurality of server apparatuses is connected, a receiving unit which receives a packet transmitted from a terminal apparatus and transferred via the second network, an encapsulating unit which encapsulates the packet received into a packet with a destination address corresponding to the address of the second router apparatus associated with an address of the packet based on the association information, and a transmitting unit which transmits the packet encapsulated by the encapsulating unit to the first network.

13 Claims, 30 Drawing Sheets

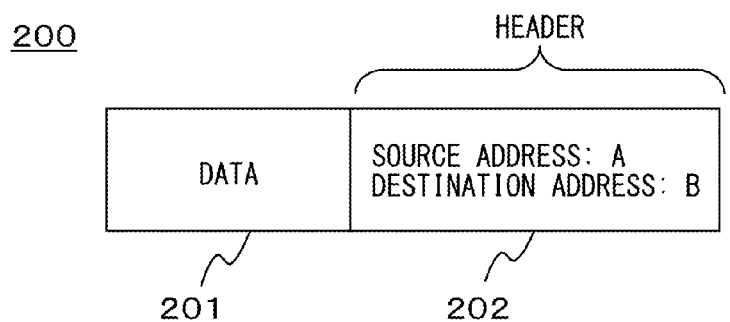
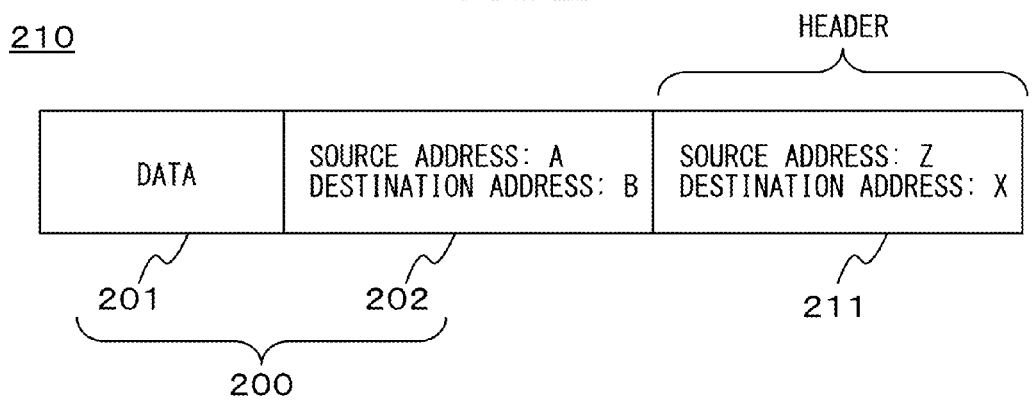

| SOURCE ADDRESS | DESTINATION ADDRESS | ALLOCATION DESTINATION ROUTER ADDRESS |
|---|---|---|
| A1 | B | X |
| A2 | B | Y |

| TERMINAL ADDRESS | ROUTER ADDRESS |
|---|---|
| A | Z |

| ADDRESS | ROUTER ADDRESS |
|---|---|
| B | X |
| B | Y |
| A | Z |

| ADDRESS | ROUTER ADDRESS | LOAD |
|---|---|---|
| B | X | 20 |
| B | Y | 10 |

20

| DESTINATION ADDRESS | ALLOCATION DESTINATION ROUTER ADDRESS |
|---|---|
| B | Y |

| ADDRESS | ROUTER ADDRESS | LOAD |
|---------|----------------|------|
| B | X | 20 |
| B | Y | 10 |

| ADDRESS | ROUTER ADDRESS |
|---|---|
| B | X |
| B | Y |
| B | W |
| A | Z |

| ADDRESS | ROUTER ADDRESS | LOAD |
|---|---|---|
| B | X | 20 |
| B | Y | 15 |
| B | W | 22 |

ROUTER APPARATUS, COMMUNICATION SYSTEM AND PACKET TRANSFER METHOD

CROSS-REFERENCE TO RELATED APPLICATIONS

This application is based upon and claims the benefit of priority of the prior Japanese Patent Application No. 2012-154591, filed on Jul. 10, 2012, the entire contents of which are incorporated herein by reference.

FIELD

Embodiments discussed herein relate to a router apparatus, a communication system, and a packet transfer method.

BACKGROUND

An example of a technique related to a wide-area load balancing technique for allocating packets among a plurality of server apparatuses is a wide-area load balancing scheme using a DNS (Domain Name System) specified in IETF (The Internet Engineering Task Force) RFC (Request for Comments) 1034. According to this wide-area load balancing scheme, different IP (Internet Protocol) addresses are assigned to a plurality of servers with the same host name. A terminal accessing the servers has a DNS cache in which the host name is associated with the IP address of one of the servers. When an application operating on the terminal accesses the servers, the host name is specified as a destination, and the terminal is allocated to one of the servers in accordance with the DNS cache.

Another example of a technique related to the wide-area load balancing technique is a wide-area load balancing scheme using NAT (Network Address Translation) specified in IETF RFC 1631. According to this wide-area load balancing scheme, different IP addresses are assigned to servers providing the same service. The IP addresses are referred to as the "actual IP addresses" of the servers. For these servers, a single IP address is visible to the terminal. This IP address is assigned to a NAT apparatus. The IP address visible to the terminal is referred to as a "virtual IP address". The NAT apparatus has a NAT table in which the virtual IP address is associated with a plurality of actual IP addresses. When receiving packets destined for the virtual IP address from a terminal, the NAT apparatus refers to the NAT table to select, for example, a server with the lowest load, and translates the destination address of the packets into the actual IP address of this server.

There is known a related technique in which a plurality of servers is connected to different VLANs, and the load condition of each of the servers is detected. The VID of packets from an information terminal is converted depending on the load condition of each server or the like to switch a server to be connected to the information terminal.

There is known another related technique in which, when a client transmits a request for access to information to a GW, the GW manipulates a DA/SA field in an IP header of an IP packet for encapsulation. The GW thus transfers the request for access to information to a server selected from a group of servers.

Related art is disclosed in Japanese National Publication of International Patent Applications No. 2003-234752 and 10-84385. Related art is also disclosed in IETF RFC 1034 (1987) and IETF RFC 1631 (1994).

SUMMARY

In accordance with an aspect of the apparatus, there is provided a router apparatus connecting a first network and a second network. The router apparatus includes a storage unit which stores association information associating an address of one of a plurality of second router apparatuses with an address of a corresponding one of a plurality of server apparatuses with an identical address, each of the plurality of second router apparatus connecting the first network to each of a plurality of third networks to which the respective plurality of server apparatuses is connected, a receiving unit which receives a packet transmitted from a terminal apparatus and transferred via the second network, an encapsulating unit which encapsulates the packet received into a packet with a destination address corresponding to the address of the second router apparatus associated with an address of the packet based on the association information, and a transmitting unit which transmits the packet encapsulated by the encapsulating unit to the first network.

A router apparatus according to another of the apparatus includes a receiving unit which receives, from a second router apparatus connecting a first network and a second network, an encapsulated packet with a destination address corresponding to an address of the router apparatus connecting one of a plurality of third networks to the first network, a decapsulating unit which takes out, from the encapsulated packet, a packet transmitted by a terminal apparatus connected to the second network and destined for an identical address of a plurality of server apparatuses connected to a respective plurality of third networks, and a transmitting unit which transmits the packet taken out by the decapsulating unit to the third network connected to the first network by the router apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2A is a schematic diagram of an example of a packet transmitted by a terminal.

FIG. 2B is a schematic diagram of an example of an encapsulated packet.

FIG. 3 is a diagram of a first example of allocation destination information.

FIG. 10 is a diagram depicting a variation of allocation destination information.

FIG. 12 is a diagram depicting an example of transfer destination information.

FIG. 13A is a diagram depicting a first example of address mapping information.

FIG. 13B is a diagram depicting a first example of load information.

FIG. 33A is a diagram depicting a second example of address mapping information.

FIG. 33B is a diagram depicting a second example of load information.

DESCRIPTION OF EMBODIMENTS

According to the DNS scheme, a change of an allocation destination server apparatus changes the IP address of the server apparatuses visible to the terminal apparatus accessing the server apparatuses. Thus, for example, a TCP (Transmission Control Protocol) session may disadvantageously be disconnected. Furthermore, according to the NAT scheme, the load of a packet allocation process may disadvantageously concentrate on the NAT apparatus. The virtual IP address is assigned to the NAT apparatus, and thus, all packets from terminals reach the NAT apparatus. Packets destined for terminals by servers also pass through the NAT apparatus because the source address needs to be changed from an actual IP address back to a virtual IP address.

An object of an apparatus or a method disclosed herein is to distribute a packet allocation process enabling a change of an allocation destination server apparatus, among a plurality of apparatuses without changing the address of server apparatuses visible to the terminal apparatus.

<1. First Embodiment>
<1.1. Configuration of the Communication System>

Figure 1:
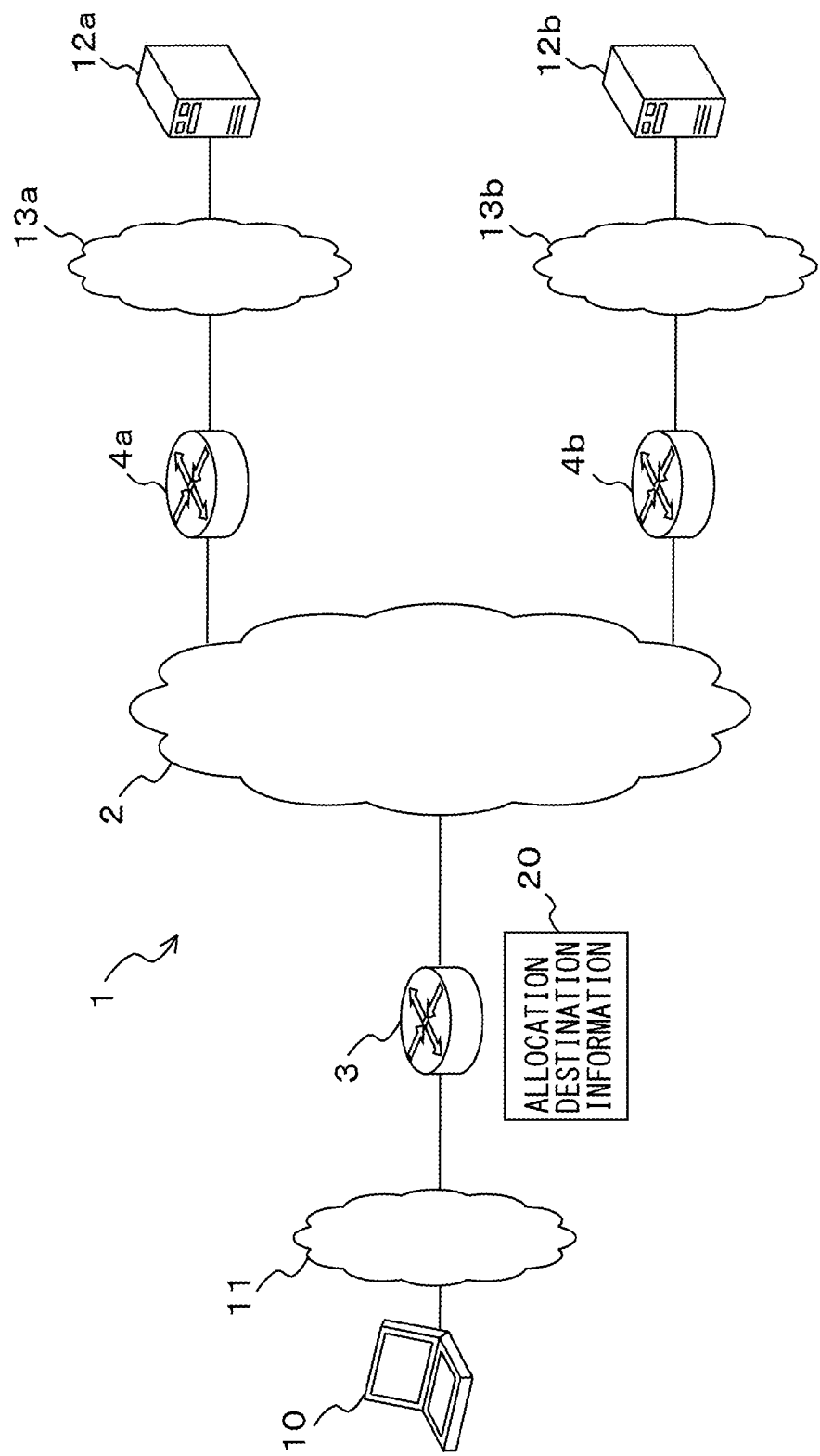
FIG. 1 is a diagram depicting a general configuration of a first example of a communication system.

Preferred embodiments will be illustrated below with reference to the attached drawings. FIG. 1 is a diagram depicting a general configuration of a first example of a communication system. A communication system 1 includes a first network 2 and router apparatuses 3, 4a, and 4b. The router apparatus 3 is an edge router that connects a second network 11 with a first communication apparatus 10 connected thereto to the first network 2. The router apparatuses 4a and 4b are edge routers connecting a respective plurality of third networks 13a and 13b with a respective plurality of second communication apparatuses 12a and 12b connected thereto, to the first network 2.

The first network 2 may be, for example, a wide area network (WAN). Furthermore, the second network 11 and the third networks 13a and 13b may be, for example, local area networks (LAN). In an example illustrated below, the first network 2 is a wide area network, and the second network 11 and the third networks 13a and 13b are local area networks. However, the example is not intended to limit the application of the router apparatuses and server apparatuses illustrated herein to router apparatuses and server apparatuses used in a wide area network connected to local area networks. The router apparatuses and server apparatuses illustrated herein can be utilized in various types of communication networks on which packet communication is carried out.

Furthermore, in the examples illustrated below, the second communication apparatuses 12a and 12b are server apparatuses, and the first communication apparatus 10 is a terminal apparatus that carries out packet communication with the server apparatus 12a or 12b. However, the examples are not intended to limit the use of the router apparatuses and server apparatuses illustrated herein to communication between a terminal apparatus and a server apparatus. The router apparatuses and server apparatuses illustrated herein can be utilized for communication between various types of communication apparatuses that carry out packet communication. In the description below and the attached drawings, the terminal apparatus, the router apparatus, and the server apparatus are sometimes referred to as a "terminal", a "router", and a "server". The servers 12a and 12b are sometimes collectively referred to as a "server 12". The local area networks 13a and 13b are sometimes referred to as a "local area network 13". The routers 4a and 4b are sometimes collectively referred to as a "router 4".

In the description below, connection by the router 3 of the local area network 11 connected to the terminal 10 to the wide area network 2 is sometimes referred to as "accommodation" of the terminal 10. Similarly, connection, by the router 4, of the local area network 13 connected to the server 12 to the wide area network 2 is sometimes referred to as "accommodation" of the server 12.

The servers 12a and 12b provide the same service to the terminal 10 and are assigned with the same IP address. In the description below and the attached drawings, the "IP address" is sometimes referred to as an "address". The address of the terminal 10 is "A", and the address of the servers 12a and 12b is "B". Furthermore, the addresses of the routers 4a and 4b on the wide area network 2 are "X" and "Y", respectively. The address of the router 3 on the wide area network 2 is "Z".

When receiving a packet destined for the server 12 from the terminal 10, the router 3 allocates the received packet to the server 12a or 12b. FIG. 2A is a schematic diagram of an example of a packet transmitted by the terminal 10. A received packet 200 contains data 201 and a header 202. The header 202 contains a source address "A" and a destination address "B" of the packet 200.

The allocation of the received packet is carried out by embedding the received packet in a packet destined for one of the routers 4a and 4b and transferring the packet to the wide area network 2 for the routers 4a and 4b. In the description below and the attached drawings, the process of embedding the received packet in the packet destined for the router 4 is referred to as "encapsulation". FIG. 2B is a schematic diagram of an example of an encapsulated packet 210. Now, the received packet is assumed to be allocated to the server 12a. The packet 210 contains the original packet 200 and a header 211 of the packet 210 itself. The header 211 contains the address "Z" of the router 3, which is a source, and the address "X" of the router 4a, which accommodates the server 12a, which is an allocation destination, as a source address and a destination address, respectively. In a certain embodiment, the router 3 may encapsulate the received packet in accordance with LISP (Locator/ID Separation Protocol) discussed in IETF.

The router 3 stores allocation destination information 20 indicative of the destination address of the received packet associated with the address of the router 4 to which the received packet is to be allocated. The router 3 determines the router 4 to which the received packet is to be allocated in accordance with the allocation destination information 20. FIG. 3 is a diagram depicting a first example of the allocation destination information 20. The allocation destination information 20 includes information elements "destination address" and "allocation destination router address". The information element "destination address" is indicative of the destination address of the received packet. The address of the router 4 to which each of the packets with respective destination addresses is to be allocated is specified by the information element "allocation destination router address". In the example in FIG. 3, a packet with the destination address "B" is transferred to the router 4a with the address "X". An example of the allocation destination information 20 is a map cache used according to LISP.

Upon receiving an encapsulated packet, the router 4 takes the embedded original packet out from the encapsulated packet. In the description below and the attached drawings, the process of taking the original packet out from the encapsulated packet is referred to as "decapsulation". The router 4 transfers the original packet to the server 12 with the address "B".

According to the present embodiment, the same address can be assigned to the plurality of servers 12a and 12b providing the same service. Thus, even when the allocation destination of a packet from the terminal 10 is switched between the server 12a and the server 12b, the address of the server 12 visible to the terminal 10 remains unchanged. Furthermore, since the individual routers 3 accommodating the respective terminals 10 carry out packet allocation, the packet allocating operation is distributed.

<1.2. Hardware Configuration>

Figure 4:
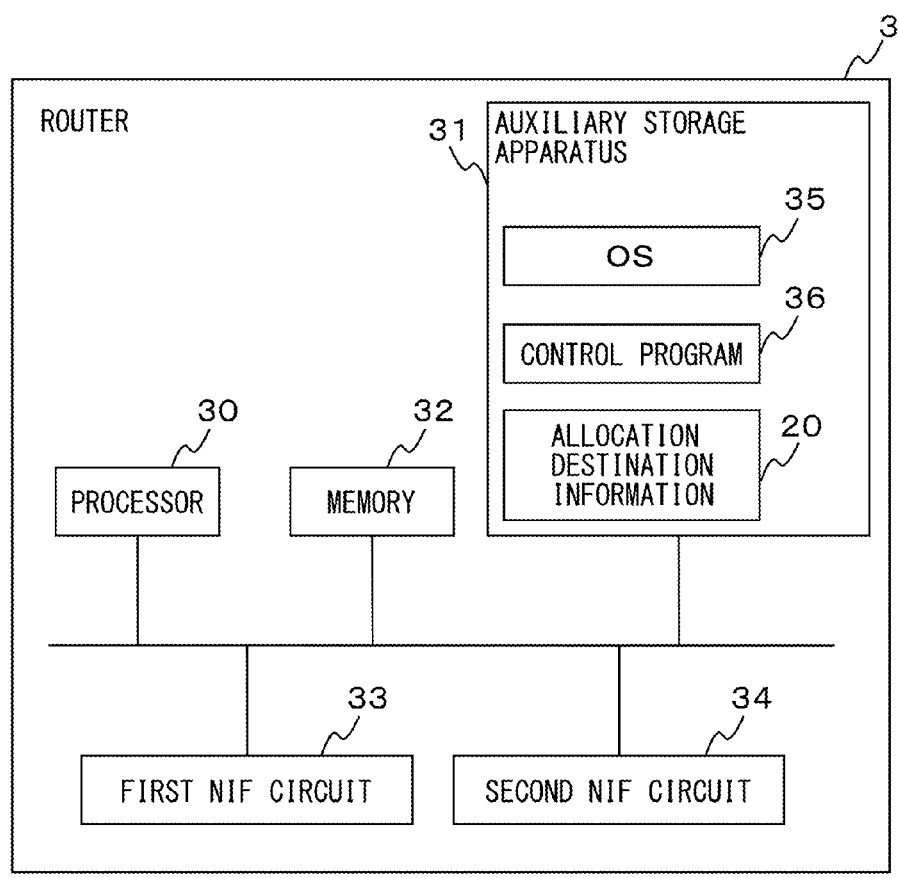
FIG. 4 is a diagram depicting an example of a hardware configuration of a router apparatus on a terminal apparatus side.

In the following, the configurations and functions of the router 3 and router 4 performing the above-described operation will be illustrated. FIG. 4 is a diagram depicting an example of a hardware configuration of the router 3. The router 3 includes a processor 30, an auxiliary storage apparatus 31, a memory 32, a first network interface circuit 33, and a second network interface circuit 34. In the description below and the attached drawings, the network interface is sometimes referred to as an "NIF".

The processor 30 allows the router 3 to perform a packet transfer operation. The auxiliary storage apparatus 31 is configured to store an operating system 35, a control program 36 for the packet transfer operation performed by the processor 30, and the allocation destination information 20. The auxiliary storage apparatus 31 includes a nonvolatile storage apparatus. The nonvolatile storage apparatus may be, for example, a read only memory (ROM), a flash memory, or a hard disk. In the description below and the attached drawings, the operating system is sometimes referred to as an "OS".

The memory 32 is configured to store a computer program being currently executed by the processor 30 and data temporarily used by the program. The memory 32 may include a random access memory (RAM). The first NIF circuit 33 carries out a process of transmitting and receiving packets to and from the local area network 11. The second NIF circuit 34 carries out a process of transmitting and receiving packets to and from the wide area network 2.

Figure 5:
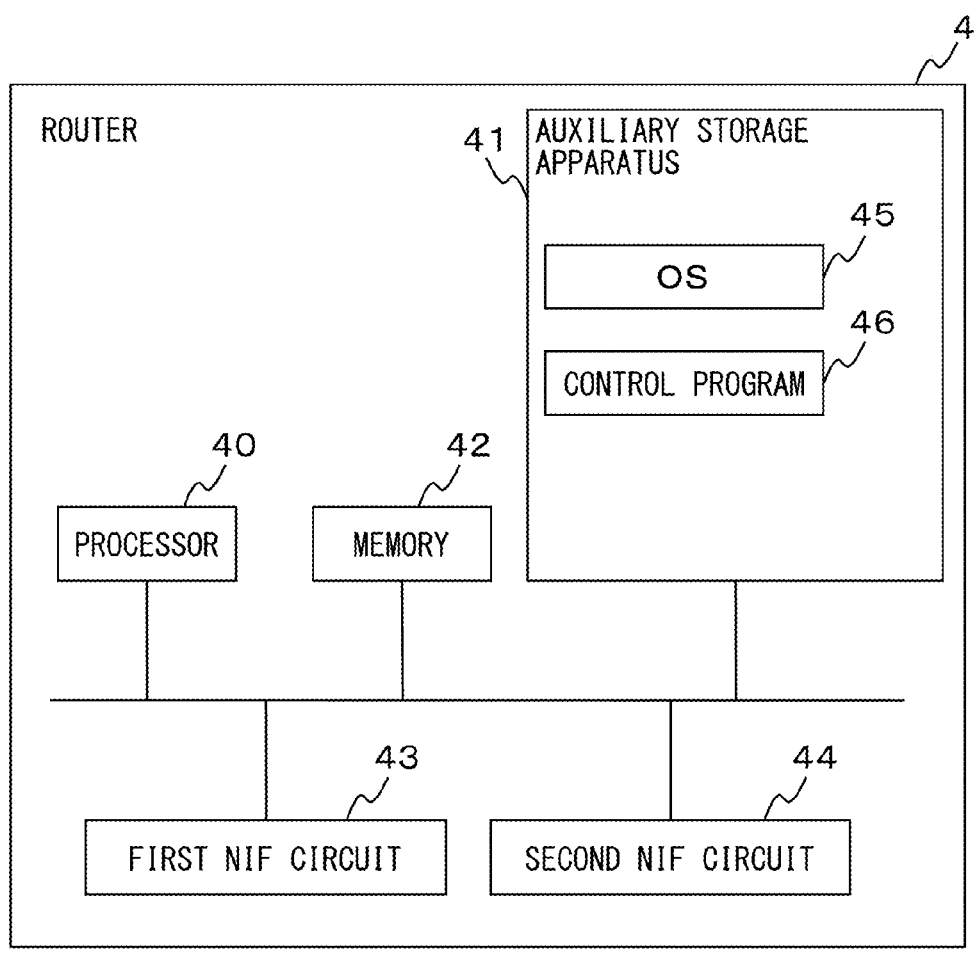
FIG. 5 is a diagram depicting an example of a hardware configuration of a router apparatus on a server apparatus side.

FIG. 5 is a diagram depicting an example of a hardware configuration of the router 4. The router 4 includes a processor 40, an auxiliary storage apparatus 41, a memory 42, a first NIF circuit 43, and a second NIF circuit 44. The processor 40 allows the router 4 to perform a packet transfer operation. The auxiliary storage apparatus 41 is configured to store an OS 45 and a control program 46 for the packet transfer operation performed by the processor 40. The auxiliary storage apparatus 41 includes a nonvolatile storage apparatus.

The memory 42 is configured to store a computer program being currently executed by the processor 40 and data temporarily used by the program. The memory 42 may include a random access memory. The first NIF circuit 43 carries out a process of transmitting and receiving packets to and from the local area network 13. The second NIF circuit 44 carries out a process of transmitting and receiving packets to and from the wide area network 2.

The hardware configurations depicted in FIG. 4 and FIG. 5 are merely for illustrative purposes to describe the embodiments. Given that the routers described herein perform the operations described below, the routers may adopt any other hardware configuration.

<1.3. Functional Configuration>

Figure 6:
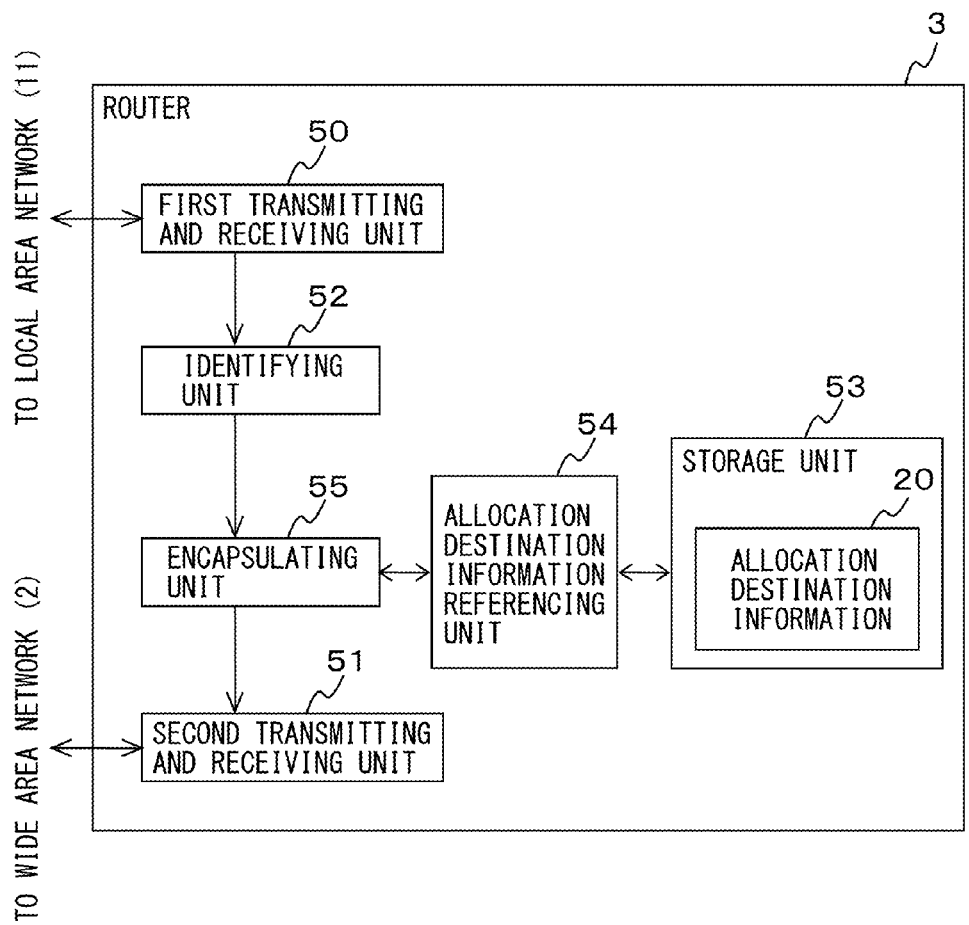
FIG. 6 is a diagram depicting a first example of a functional configuration of the router apparatus on the terminal apparatus side.

The functions of the router 3 and the router 4 implemented by the hardware configurations depicted in FIG. 4 and FIG. 5 will be illustrated. FIG. 6 is a diagram depicting a first example of a functional configuration of the router 3. The router 3 includes a first transmitting and receiving unit 50, a second transmitting and receiving unit 51, an identifying unit 52, a storage unit 53, and a allocation destination information referencing unit 54, and an encapsulating unit 55.

The first transmitting and receiving unit 50 carries out a process of receiving packets from the local area network 11 and a process of transmitting packets to the local area network 11. The second transmitting and receiving unit 51 carries out a process of receiving packets from the wide area network 2 and a process of transmitting packets to the wide area network 2. The identifying unit 52 carries out a process of identifying packets received from the local area network 11.

When a packet transmitted by the terminal 10 is received via the local area network 11, the allocation destination information referencing unit 54 references the allocation destination information 20 stored in the storage unit 53. The allocation destination information referencing unit 54 acquires, from the allocation destination information 20, the address of the router 4 to which the received packet 200 is to be allocated and which is designated in accordance with the destination address of the received packet 200. The allocation destination information referencing unit 54 outputs the acquired address of an allocation destination router 4 to the encapsulating unit 55.

The encapsulating unit 55 generates a packet 210 which designates the address of the router 3 as a source address and which designates the address of the allocation destination router 4, as a destination address. The encapsulating unit 55 embeds the received packet 200 in the generated packet 210 to encapsulate the received packet 200. The second transmitting and receiving unit 51 transfers the encapsulated packet 210 to the wide area network 2.

The above-described operation of the first transmitting and receiving unit 50 is performed through cooperation between the first NIF circuit 33 depicted in FIG. 4 and the processor 30 executing the control program 36. The above-described operation of the second transmitting and receiving unit 51 is performed through cooperation between the second NIF circuit 34 and the processor 30 executing the control program 36. The above-described operations of the identifying unit 52, the allocation destination information referencing unit 54, and the encapsulating unit 55 are performed by the processor 30 executing the control program 36. A storage area for the storage unit 53 is provided in the auxiliary storage apparatus 31.

Figure 7:
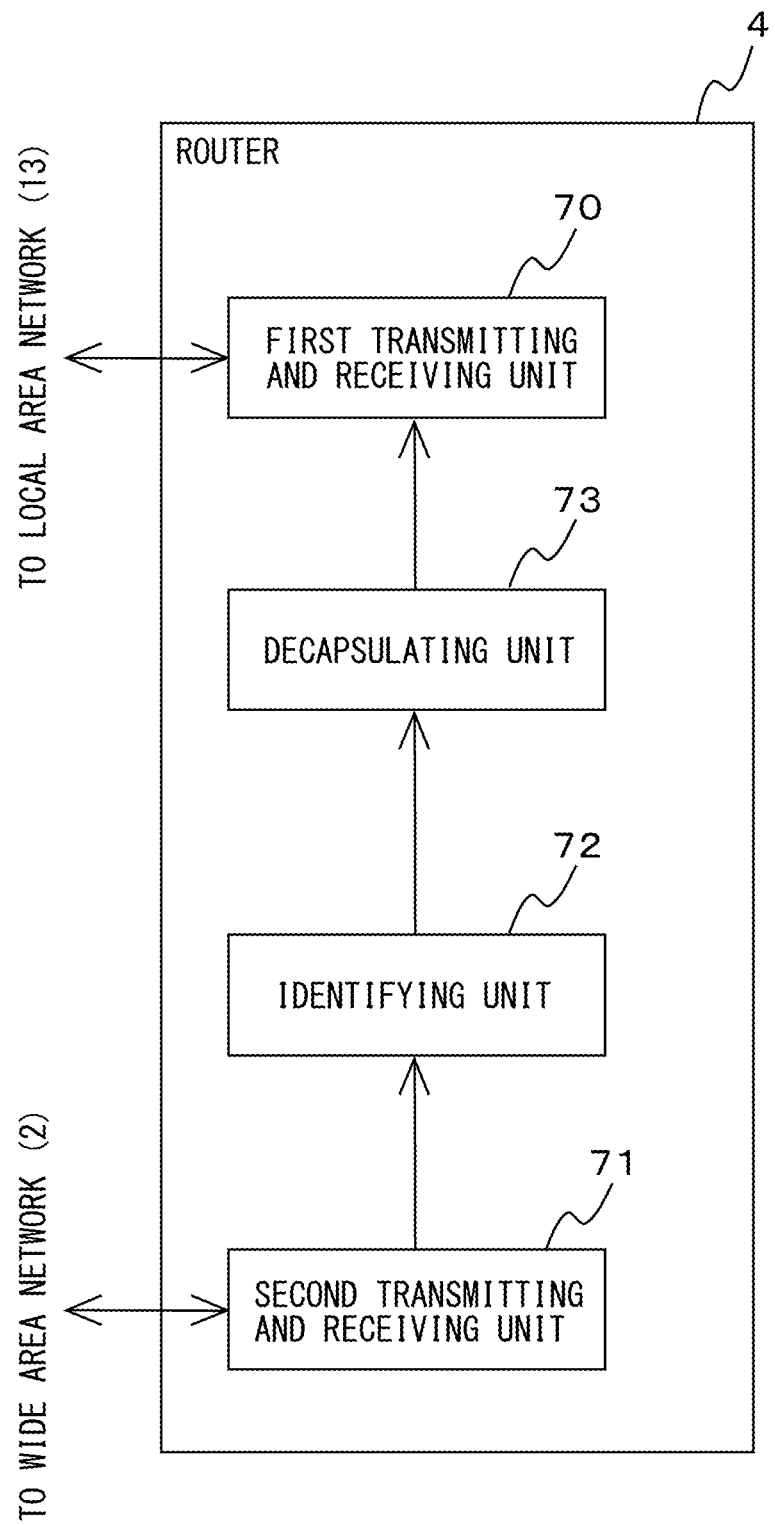
FIG. 7 is a diagram depicting a first example of a functional configuration of the router apparatus on the server apparatus side.

FIG. 7 is a diagram depicting a first example of a functional configuration of the router 4. The router 4 includes a first transmitting and receiving unit 70, a second transmitting and receiving unit 71, an identifying unit 72, and a decapsulating unit 73. The first transmitting and receiving unit 70 carries out a process of receiving packets from the local area network 13 and a process of transmitting packets to the local area network 13. The second transmitting and receiving unit 71 carries out a process of receiving packets from the wide area network 2 and a process of transmitting packets to the wide area network 2. The identifying unit 72 carries out a process of identifying packets received from the wide area network 2.

When the encapsulated packet 210 transmitted by the router 3 is received via the wide area network 2, the decapsulating unit 73 decapsulates the packet 210 to take out the original packet 200. The first transmitting and receiving unit 70 transfers the original packet 200 to the local area network 13.

The above-described operation of the first transmitting and receiving unit 70 is performed through cooperation between the first NIF circuit 43 depicted in FIG. 5 and the processor 40 executing the control program 46. The above-described operation of the second transmitting and receiving unit 71 is performed through cooperation between the second NIF circuit 44 and the processor 40 executing the control program 46. The above-described operations of the identifying unit 72 and the decapsulating unit 73 are performed by the processor 40 executing the control program 46.

Furthermore, diagrams of functional configurations in FIG. 6 and FIG. 7 mainly depict components related to the functions of the router 3 and the router 4 illustrated herein. The router 3 and the router 4 may include components other than the depicted components. This also applies to diagrams of functional configurations in FIG. 16, FIG. 17, FIG. 25, FIG. 26, and FIG. 30.

<1.4. Illustration of Operations>

Figure 8:
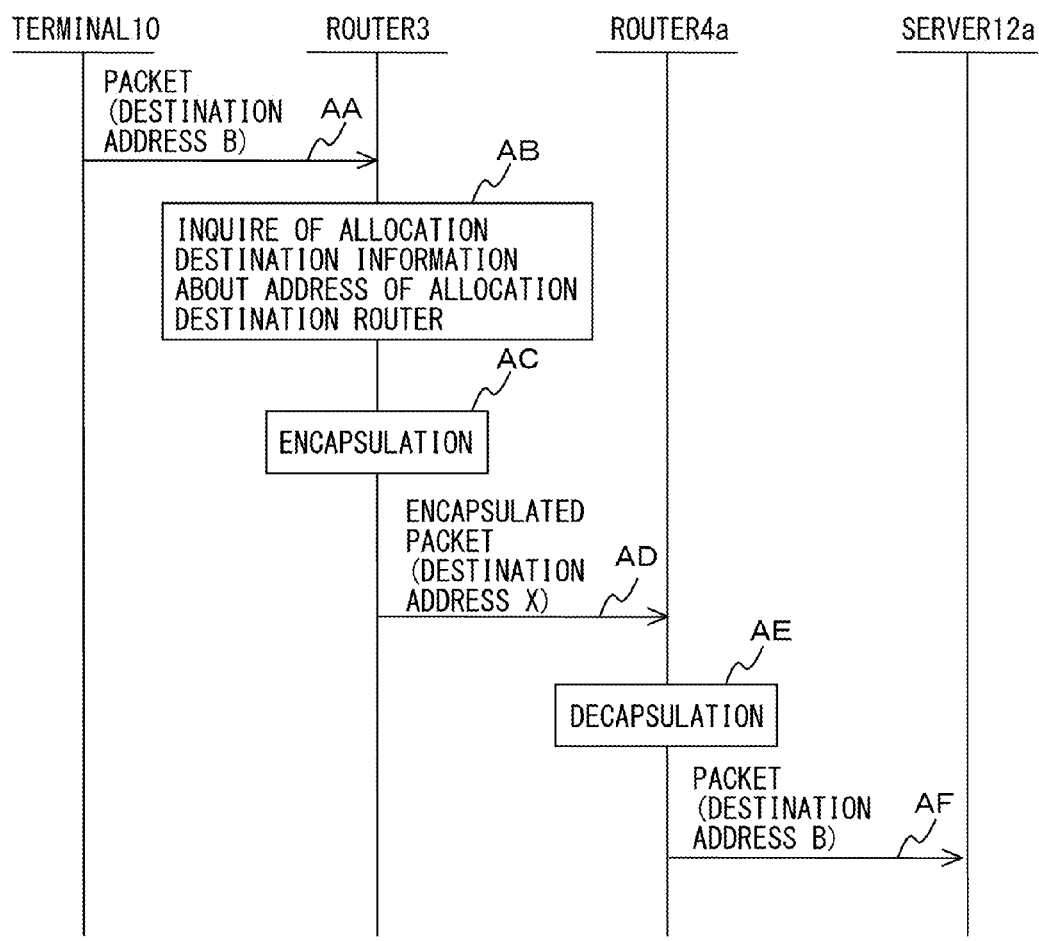
FIG. 8 is a sequence diagram illustrating a first example of a packet allocating operation.

A first example of a packet allocating operation performed by the router 3 and the router 4 will be illustrated with reference to FIG. 8. A series of operations illustrated with reference to FIG. 9 may be interpreted as a method including a plurality of procedures. In this case, the "operation" is interchangeable with a "step". This also applies to operations depicted in FIG. 19, FIG. 24, FIG. 27, FIG. 31, and FIG. 34.

In an operation AA, the terminal 10 transmits the packet 200 destined for the server 12. As the destination address of the packet 200, the address "B" of the server 12 is designated. When the packet 200 is received by the router 3, the allocation destination information referencing unit 54 of the router 3 references, in an operation AB, the allocation destination information 20. The allocation destination information referencing unit 54 acquires the address "X" of the router 4a to which the received packet 200 is to be allocated, from the allocation destination information 20.

In an operation AC, the encapsulating unit 55 encapsulates the received packet 200. The address "X" is designated as the destination address of the encapsulated packet 210. In an operation AD, the second transmitting and receiving unit 51 transfers the encapsulated packet 210 to the wide area network 2.

In an operation AE, when the encapsulated packet 210 is received by the router 4a, the decapsulating unit 73 decapsulates the packet 210 to take out the original packet 200. In an operation AF, the first transmitting and receiving unit 70 transfers the original packet 200 to the local area network 13, and then, the server 12a receives the packet 200.

<1.5. Effects of the Embodiment>

According to the present embodiment, the same address can be assigned to a plurality of servers. Thus, even when the allocation destination of a packet from a terminal is switched among the plurality of servers, the address of the servers visible to the terminal remains unchanged. Hence, for example, according to the TCP protocol, an identifier for a session includes the address of the server, and thus the session is disconnected when the address of the connection destination server is changed during the session. In contrast, with the present embodiment, problems such as the disconnection of a session resulting from switching of the connection destination server during the session can be avoided. The packet allocation process is carried out by individual routers connecting each local area network with a terminal connected thereto to a wide area network. Consequently, an operation of allocating packets transmitted from a plurality of local area networks is distributed.

<1.6. Variation>

The allocation destination information depicted in FIG. 3 may associate, for each of the terminals with different addresses, the destination address of the received packet with the address of the router to which the received packet is to be allocated. A variation of the communication system 1 depicted in FIG. 9, the plurality of terminals 10 and 14 are connected to the local area network 11.

Figure 9:
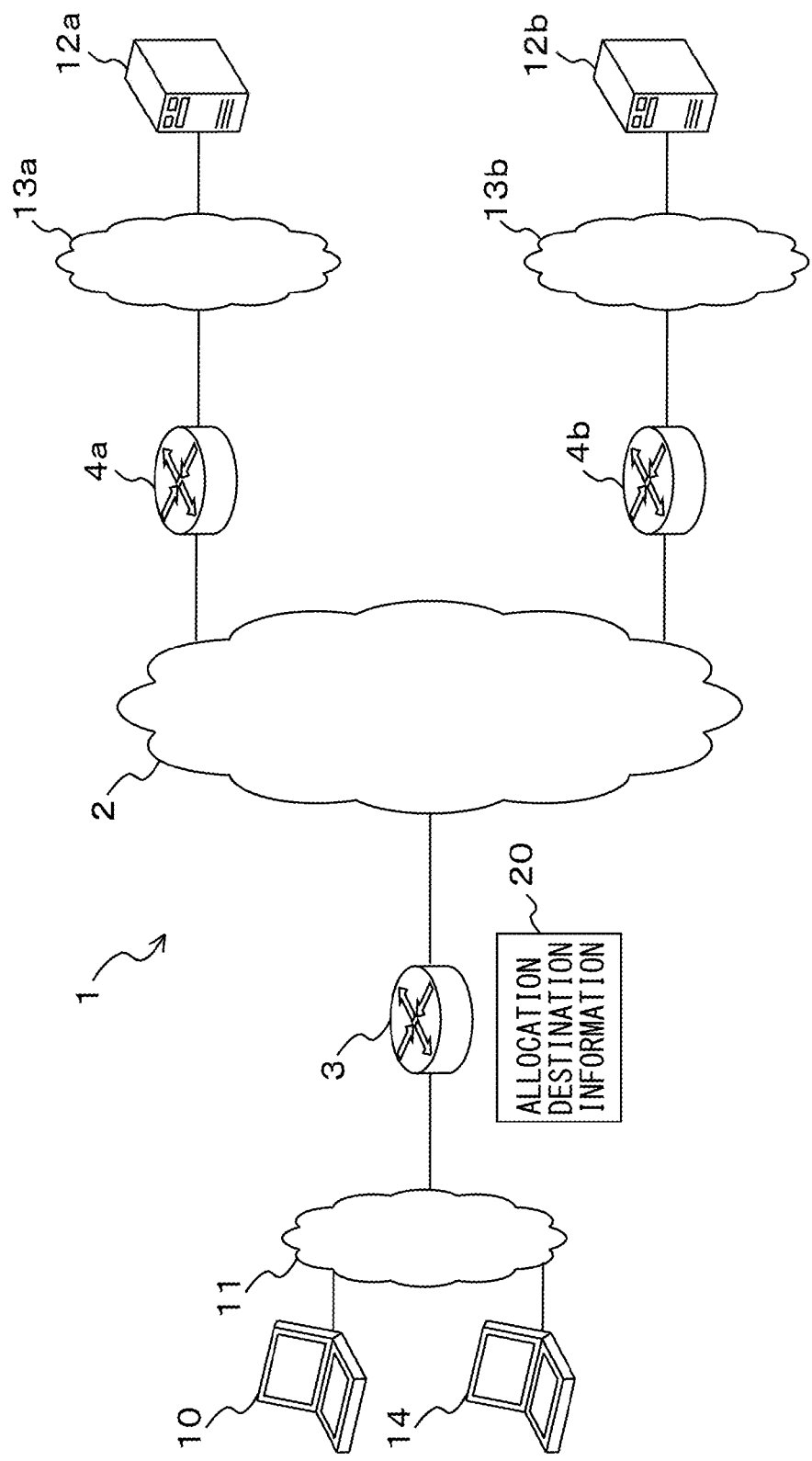
FIG. 9 is a diagram depicting a general configuration of a variation of a communication system.

FIG. 10 is a diagram depicting a variation of the allocation destination information 20 corresponding to the communication system 1 in FIG. 9. The allocation destination information 20 includes information elements "source address", "destination address", and "allocation destination router address". The information element "source address" is indicative of the source address of the received packet. The information elements "destination address" and "allocation destination router address" are similar to the information elements "destination address" and "allocation destination router address" in FIG. 3.

The allocation destination information referencing unit 54 acquires, from the allocation destination information 20, the address of an allocation destination router associated with each of the source address and destination address of the received packet. As a result, for example, a packet with a source address "A1" and the destination address "B" is transferred to the router 4a with the address "X". A packet with a source address "A2" and the destination address "B" is transferred to the router 4b with an address "Y". Thus, when the same router 3 allocates packets from the plurality of terminals 10 and 14, the allocation destination router 4 can be varied among the terminals based on the allocation destination information 20 in FIG. 10.

<2. Second Embodiment>

<2.1. General Configuration of the Communication System>

Figure 11:
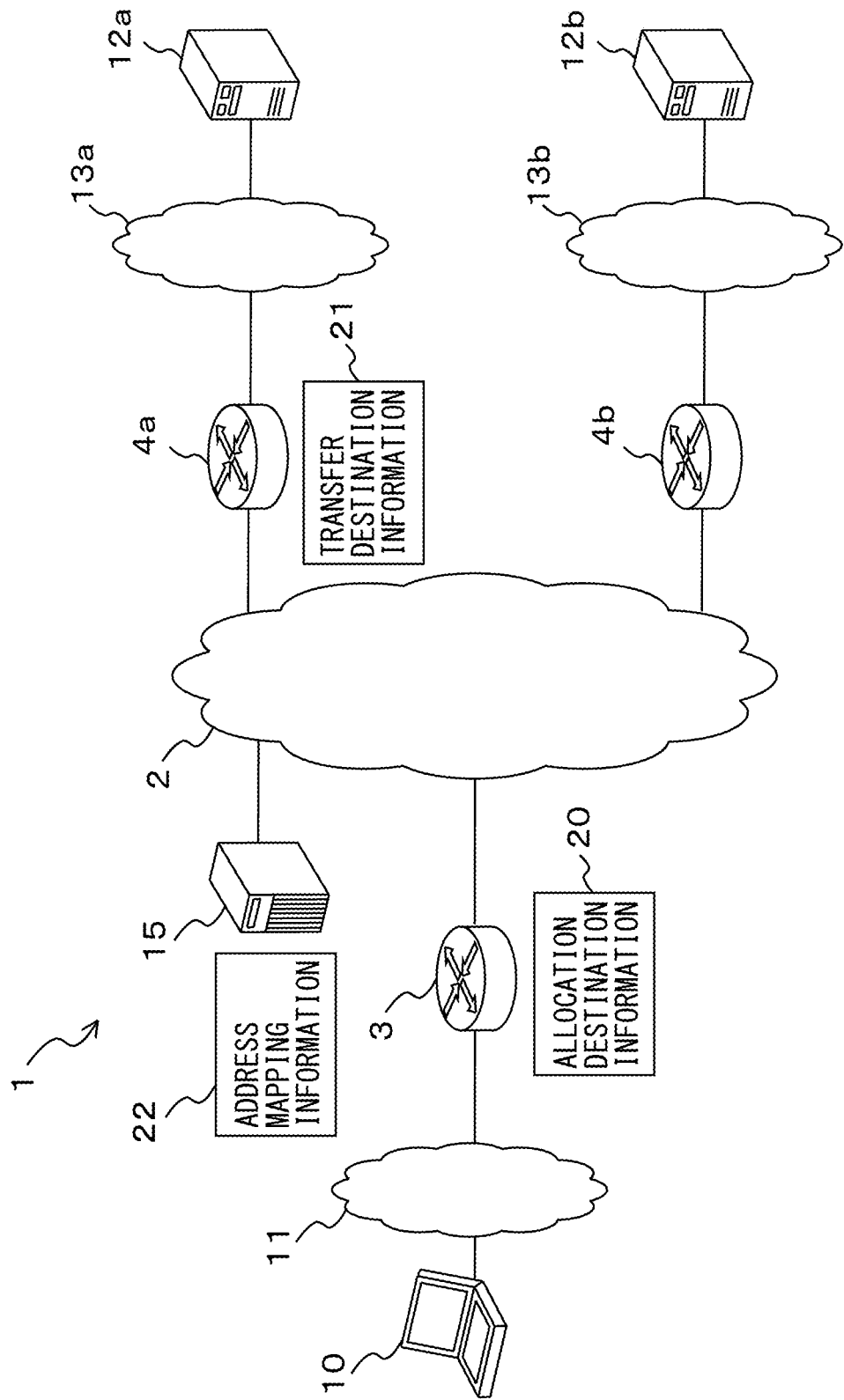
FIG. 11 is a diagram depicting a general configuration of a second example of the communication system.

Another embodiment of the communication system 1 will be illustrated. The communication system 1 according to the present embodiment switches the server 12 to which a packet is to be allocated by the router 3 without changing the address of the server 12 visible to the terminal 10. FIG. 11 is a diagram depicting a general configuration of a second example of the communication system 1. Components of the second example which are similar to the corresponding components depicted in FIG. 1 are denoted by the same reference numerals as used in FIG. 1. Description of the same functions is omitted. The communication system 1 includes a position managing server 15.

The server 12a transmits a change request signal requesting a change of the allocation destination of a packet from the terminal 10 transmitting the packet to the server 12a, to the router 4a accommodating the server 12a. The change request signal contains the designations of the address "B" of the server 12a and the address "A" of the terminal 10. The router 4a identifies the address "Z" of the router to which the packet from the terminal 10 is to be allocated, i.e., the router 3 accommodating the terminal 10, in accordance with the address "A" of the terminal 10 contained in the change request signal. The router 4a is configured to store transfer destination information 21 associating the address of the terminal 10 with address of the router 3 to which the packet from the terminal 10 is to be allocated.

FIG. 12 is a diagram depicting an example of the transfer destination information 21. The transfer destination information 21 includes information elements "terminal address" and "router address". The information element "terminal address" is indicative of the address of the terminal 10 accessing the server 12. The information element "router address" is indicative of the address of the router 3 to which the packet from the terminal 10 is to be allocated. In the example in FIG. 12, a packet with the address "A" transmitted by the terminal 10 is allocated by the router 3 with the address "Z". The router 4a may use for example, as the transfer destination information 21, a map cache used according to LISP so that the server 12a can encapsulate the packet from the terminal 10 and transfer the encapsulated packet to the router 3.

The router 4 identifies the router 3 to which the packet from the terminal 10 with the address "A" designated in the change request signal is to be allocated, based on the transfer destination information 21. The router 4 transfers the change request signal to the router 3. The router 3 transmits, to the position managing server 15, a request signal requesting the address of the allocation destination router 4 to which the encapsulated packet destined for the server 12 is to be transferred. An example of the request signal may be a map request used according to LISP.

When receiving the request signal, the position managing server 15 identifies the addresses of the plurality of routers 4a and 4b accommodating the respective servers 12a and 12b with the address "B". The position managing server 15 is configured to store the address mapping information 22 associating the address of the server 12 with the addresses of the plurality of routers 4 accommodating the server 12. An example of the address mapping information 22 may be a map table used according to LISP.

FIG. 13A is a diagram depicting a first example of the address mapping information 22. The address mapping information 22 includes information elements "address" and "router address". The information element "address" is indicative of the address of each server 12. The information element "router address" is indicative of the address of the router 4 accommodating the server 12. In the example in FIG. 13A, the plurality of servers 12a and 12b with the address "B" are accommodated in the plurality of routers 4a and 4b with the addresses "X" and "Y", respectively. The address mapping information 22 may be stored together with an association of the address "A" of the terminal 10 with the address "Z" of the router 3 accommodating the terminal 10.

When the address mapping information 22 indicates that the address "B" of the server 12 is associated with the addresses "X" and "Y" of the plurality of routers 4a and 4b, the position managing server 15 selects one of the routers. According to a certain embodiment, the position managing server 15 may preferentially select a router accommodating a server 12 with a lower load. The position managing server 15 according to the present embodiment selects a router accommodating a server 12 with the lowest load. Thus, the position managing server 15 is configured to store load information 86 that is a record of the load on each server 12.

FIG. 13B is a diagram depicting a first example of the load information 86. The load information 86 includes information elements "address", "router address", and "load". The information elements "address" and "router address" are similar to the information elements "address" and "router address" in FIG. 13A. The information element "load" is indicative of the amount of the load on each server 12. In the example in FIG. 13B, the loads on the servers 12a and 12b are "20" and "10", respectively. The position managing server 15 selects the router 4b accommodating the server 12b with the lowest load.

Figures 14, 15:
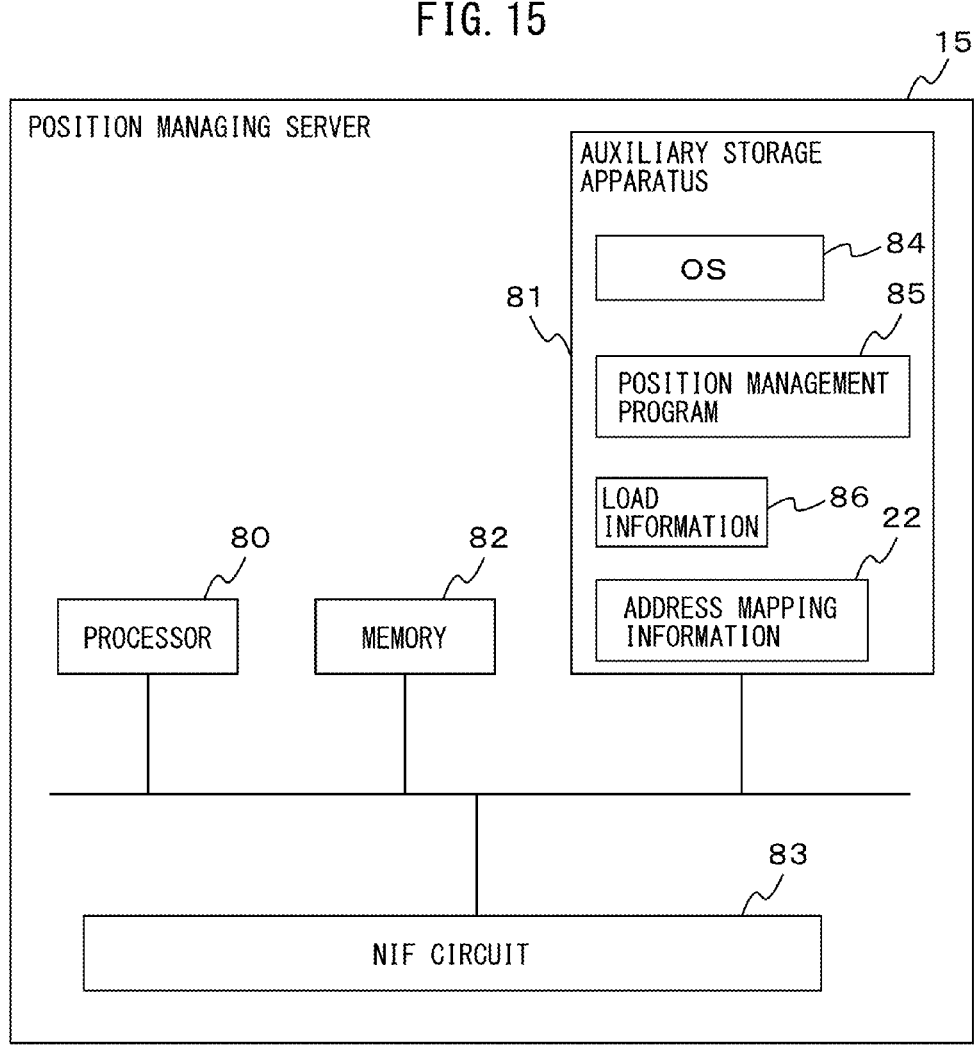
FIG. 14 is a diagram illustrating update of allocation destination information.
FIG. 15 is a diagram depicting an example of a hardware configuration of a position managing server apparatus.

The position managing server 15 transmits a reply signal containing the address "Y" of the selected router 4b and the address "B" of the server 12 to the router 3 as a reply to the request signal. An example of the reply signal may be a map reply used according to LISP. When receiving the reply signal containing the address "Y" of the router 4b, the router 3 updates the allocation destination information 20 such that a packet destined for the server 12 with the address "B" is allocated to the router 4b with the address "Y". FIG. 14 depicts the updated allocation destination information.

Thus, the destination to which the packet is to be allocated by the router 3 is switched from the server 12a to the server 12b without changing the address of the server 12 visible to the terminal 10. Furthermore, the packet from the terminal 10 is preferentially allocated to the server 12 with a lower load. This enables a reduction in the bias of distribution of the load among the servers.

<2.2. Hardware Configuration>

A hardware configuration of the position managing server 15 will be illustrated. FIG. 15 is a diagram depicting an example of a hardware configuration of the position managing server 15. The position managing server 15 includes a processor 80, an auxiliary storage apparatus 81, a memory 82, and an NIF circuit 83.

The processor 80 performs operations of the position managing server 15 described below. The auxiliary storage apparatus 81 is configured to store an operating system 84, a position managing program 85 for allowing the processor 80 to perform operations illustrated below, address mapping information 22, and load information 86. The auxiliary storage apparatus 81 includes a nonvolatile storage apparatus.

The memory 82 is configured to store a computer program being currently executed by the processor 80 and data temporarily used by the program. The memory 82 may include a random access memory. The NIF circuit 83 carries out a process of transmitting and receiving packets to and from the wide area network 2.

The hardware configuration depicted in FIG. 15 is merely for illustrative purpose to describe the embodiment. Given that the position managing server 15 described herein performs the operations described below, the position managing server 15 may adopt any other hardware configuration.

<2.3. Functional Configuration>

Figure 16:
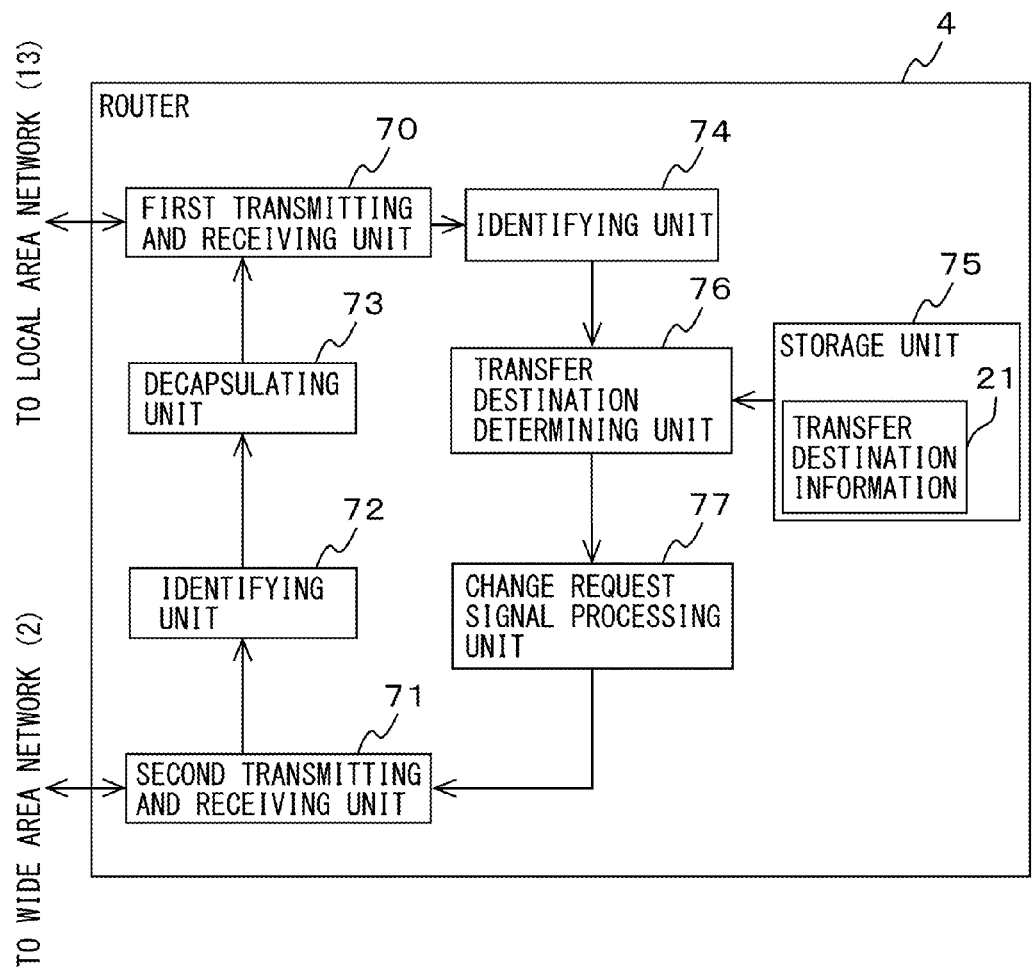
FIG. 16 is a diagram depicting a second example of the functional configuration of the router apparatus on the server apparatus side.

The functions of the router 3, the router 4, and the position managing server 15 according to the second embodiment will be illustrated. FIG. 16 is a diagram depicting a second example of the functional configuration of the router 4. Components of the second example which are similar to the corresponding components depicted in FIG. 7 are denoted by the same reference numerals as used in FIG. 7. Description of the same functions is omitted. The router 4 includes an identifying unit 74, a storage unit 75, a transfer destination determining unit 76, and a change request signal processing section 77.

The identifying unit 74 carries out a process of identifying packets received from the local area network 13. When a change request signal transmitted by the server 12 is received via the local area network 13, the transfer destination determining unit 76 references the transfer destination information 21 stored in the storage unit 75. The transfer destination determining unit 76 acquires, from the transfer destination information 21, the address of the router 3 associated with the address of the terminal 10 designated in the change request signal. The change request signal processing unit 77 transfers the change request signal to the router 3 with the acquired address.

The above-described operations of the identifying unit 74, the transfer destination determining unit 76, and the change request signal processing unit 77 are performed by the processor 40 executing the control program 46. A storage area for the storage unit 75 is provided in the auxiliary storage apparatus 41.

Figure 17:
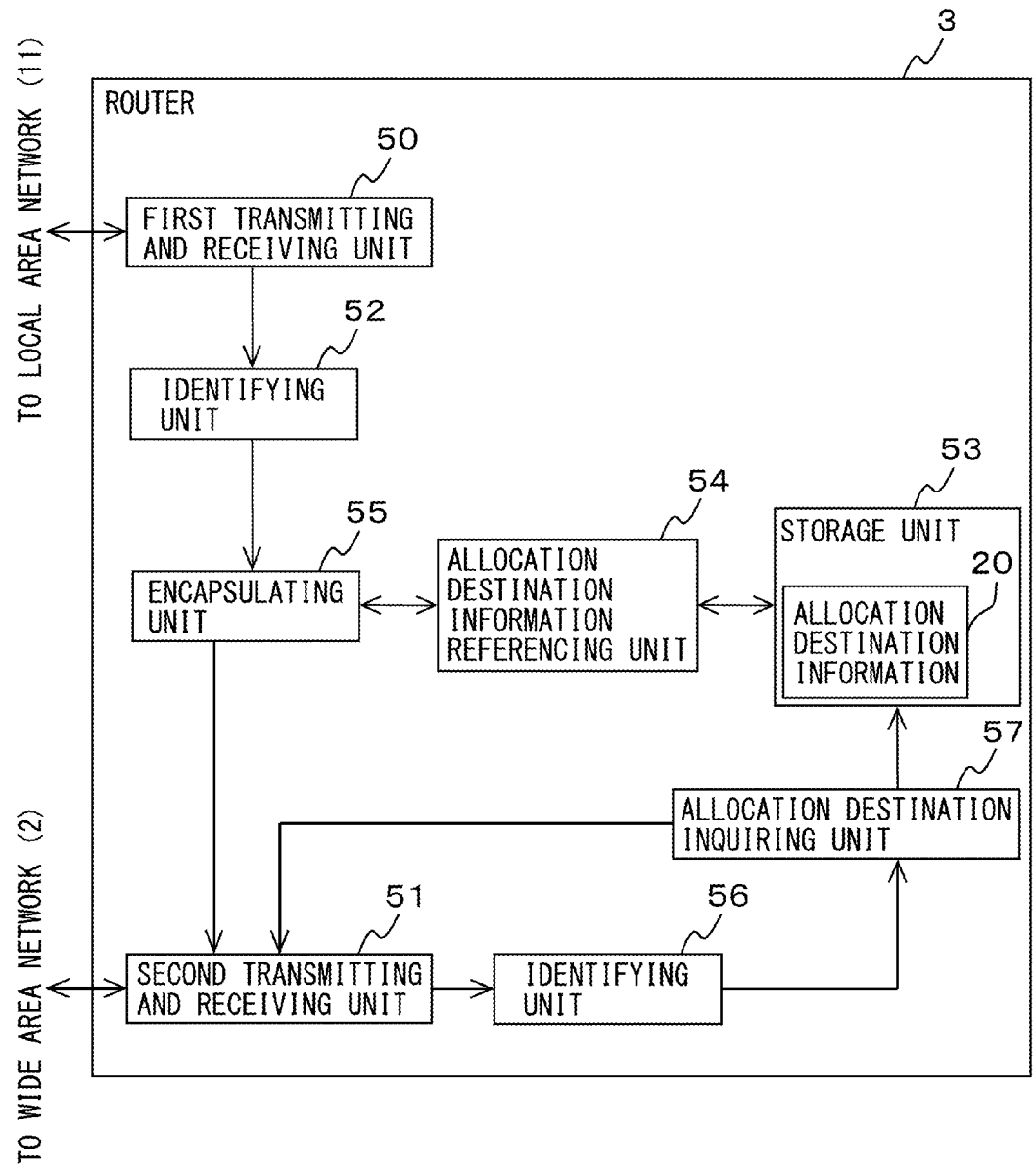
FIG. 17 is a diagram depicting a second example of the functional configuration of the router apparatus on the terminal apparatus side.

FIG. 17 is a diagram depicting a second example of the functional configuration of the router 3. Components of the second example which are similar to the corresponding components depicted in FIG. 6 are denoted by the same reference numerals as used in FIG. 7. Description of the same functions is omitted. The router 3 includes an identifying unit 56 and an allocation destination inquiring unit 57.

The identifying unit 56 carries out a process of identifying packets received from the wide area network 2. When a change request signal is received from the router 4 via the wide area network 2, the allocation destination inquiring unit 57 transmits, to the position managing server 15, a request signal requesting the address of the router 4 to which a packet destined for the server designated in the change request signal is to be allocated. Furthermore, the allocation destination inquiring unit 57 receives a reply signal transmitted by the position managing server 15 in response to the request signal. The allocation destination inquiring unit 57 updates the allocation destination information 20 such that the destination to which the packet destined for the server designated in the change request signal is to be allocated matches the router 4 designated in the replay signal.

The above-described operations of the identifying unit 56 and the allocation destination inquiring unit 57 are performed by the processor 30 depicted in FIG. 4, by executing the control program 36.

Figure 18:
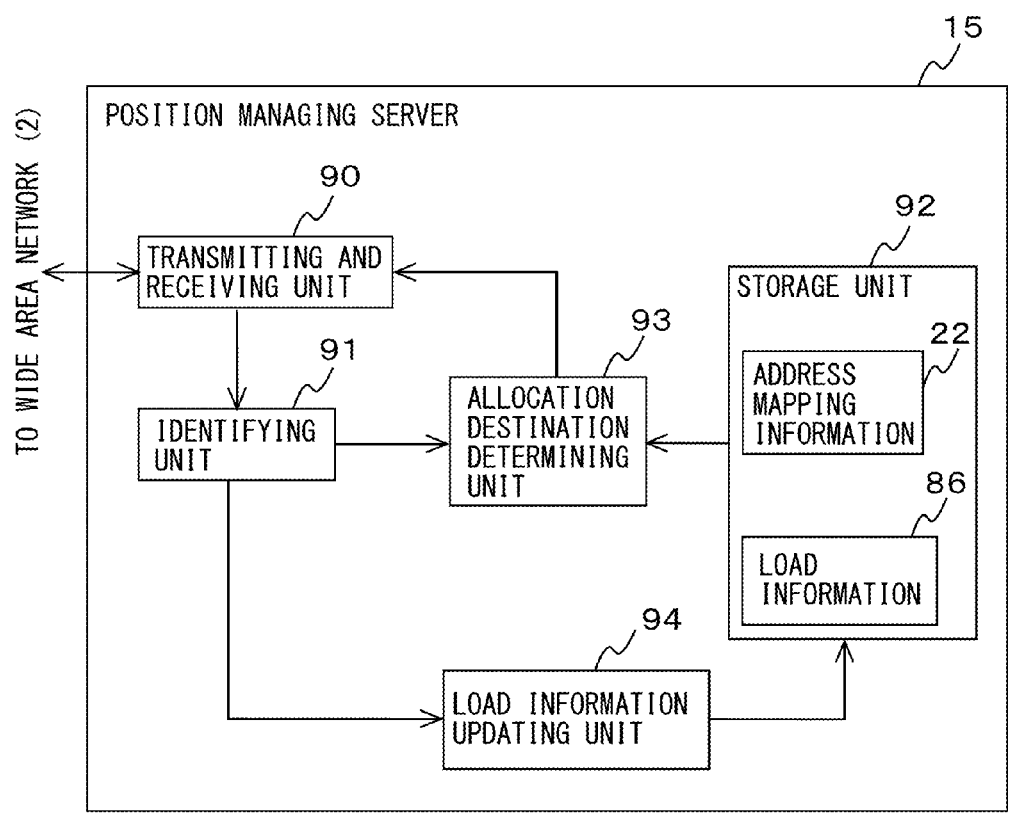
FIG. 18 is a diagram depicting a first example of a functional configuration of the position managing server apparatus.

FIG. 18 is a diagram depicting a first example of a functional configuration of the position managing server 15. The position managing server 15 includes a transmitting and receiving unit 90, an identifying unit 91, a storage unit 92, an allocation destination determining unit 93, and a load information updating unit 94.

The transmitting and receiving unit 90 carries out a process of receiving packets from the wide area network 2 and a process of transmitting packets to the wide area network 2. The identifying unit 91 carries out a process of identifying packets received from the wide area network 2. When a request signal is received from the router 3 via the wide area network 2, the allocation destination determining unit 93 acquires, from the address mapping information 22, the addresses of the router 4 associated with the address of the server designated in the request signal.

The allocation destination determining unit 93 determines one of the acquired addresses of the routers 4 to be the address of the router 4 to which the packet destined for the server designated in the request signal is to be allocated. For example, the allocation destination determining unit 93 may select the address of one of the routers 4 accommodating a server 12 with a lower load based on the load information 86. The load information updating unit 94 updates the load information 86 based on a load notification signal provided by the server 12. The load information updating unit 94 may receive the load notification signal from, for example, a load measuring agent program that operates in the server 12 to measure the load on the server 12. The allocation destination determining unit 93 transmits a reply signal containing the address of the selected router 4 and the address of the server 12 to the router 3 as a reply to the request signal.

The above-described operation of the transmitting and receiving unit 90 is performed through cooperation between the NIF circuit 83 and processor 80 depicted in FIG. 15. The above-described operations of the identifying unit 91, the allocation destination determining unit 93, and the load information updating unit 94 are performed by the processor 80 executing the position management program 85. A storage area for the storage unit 92 is provided in the auxiliary storage apparatus 81.

A diagram of a functional configuration in FIG. 18 mainly depicts components related to the functions of the position managing server 15 illustrated herein. The position managing server 15 may include components other than the depicted components. This also applies to a diagram of a functional configuration in FIG. 28.

<2.4. Illustration of Operations>

Figure 19:
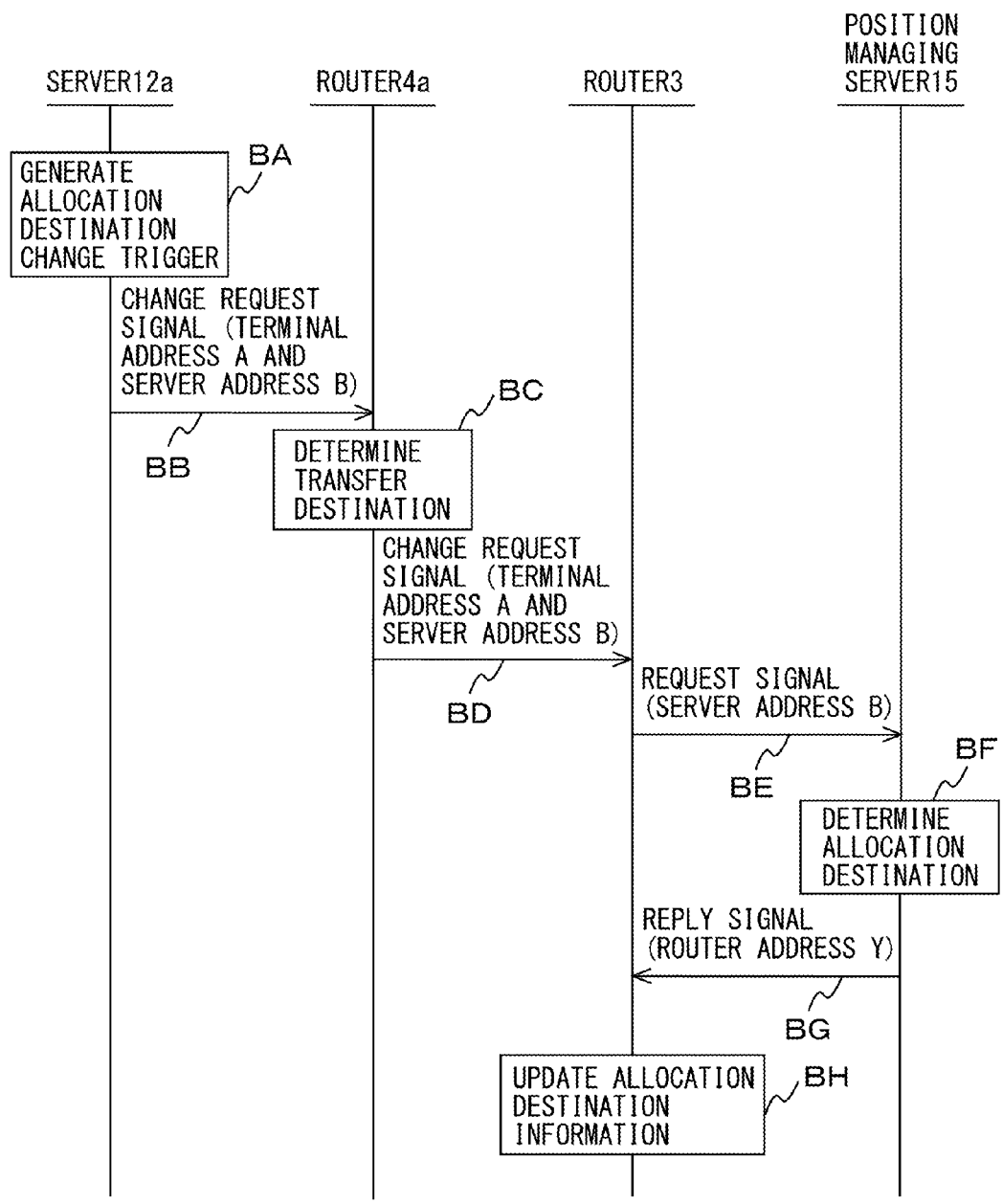
FIG. 19 is a sequence diagram illustrating a first example of an operation of changing the allocation destination of a packet.

A first example of a packet allocation destination changing operation performed by the router 3, the router 4, and the position managing server 15 will be illustrated with reference to FIG. 19. In an operation BA, the server 12a generates an allocation destination change trigger that starts an operation of changing the allocation destination of a packet from the terminal 10 transmitting the packet to the server 12a. For example, the server 12a generates the allocation destination change trigger when the load on the server 12a exceeds a threshold.

When the allocation destination change trigger is generated, the server 12a transmits, in an operation BB, a change request signal to the router 4a. The change request signal contains designations of the address "B" of the server 12a and the address "A" of the terminal 10. In an operation BC, the transfer destination determining unit 76 of the router 4a determines the router 3 to which the change request signal is to be transferred. In an operation BD, the transfer destination determining unit 76 transfers the change request signal to the router 3.

In an operation BE, the allocation destination inquiring unit 57 of the router 3 transmits a request signal to the position managing server 15 to request the address of the router 4 to which the packet destined for the server 12 with the address "B" designated in the change request signal is to be allocated. In an operation BF, the allocation destination determining unit 93 of the position managing server 15 determines the address "Y" of the router 4b to which the packet destined for the server 12 with the address "B" is to be allocated.

In an operation BG, the allocation destination determining unit 93 transmits a reply signal containing the address "Y" of the router 4b, which is the determined allocation destination, to the router 3. In an operation BH, the allocation destination inquiring unit 57 of the router 4a updates the allocation destination information 20 so that the allocation destination of the packet destined for the server 12 with the address "B" matches the router 4b designated in the reply signal.

<2.5. Effects of the Embodiment>

According to the present embodiment, the allocation destination of a packet from a terminal can be switched among a plurality of servers so that the address of the servers visible to the terminal remains unchanged. Furthermore, preferentially allocating packets to a server with a lower load enables a reduction in the concentration of the load on a particular server.

<2.6. Variation>

As described above, the router 4 may use, as the transfer destination information 21, a map cache that allows a packet from the server 12a to the terminal 10 to be encapsulated so that the encapsulated packet can be transferred to the router 3. Furthermore, the router 4 may acquire the address of the router 3 designated as a source address from the header of the encapsulated packet received from the router 3. Additionally, the router 4 may acquire the address of the terminal 10 which is the source of the original packet, from the header of the original packet embedded in the encapsulated packet. The router 4 may generate transfer destination information 21 by associating the thus acquired addresses of the router 3 and the terminal 10 with each other.

<3. Third Embodiment>

Figure 20:
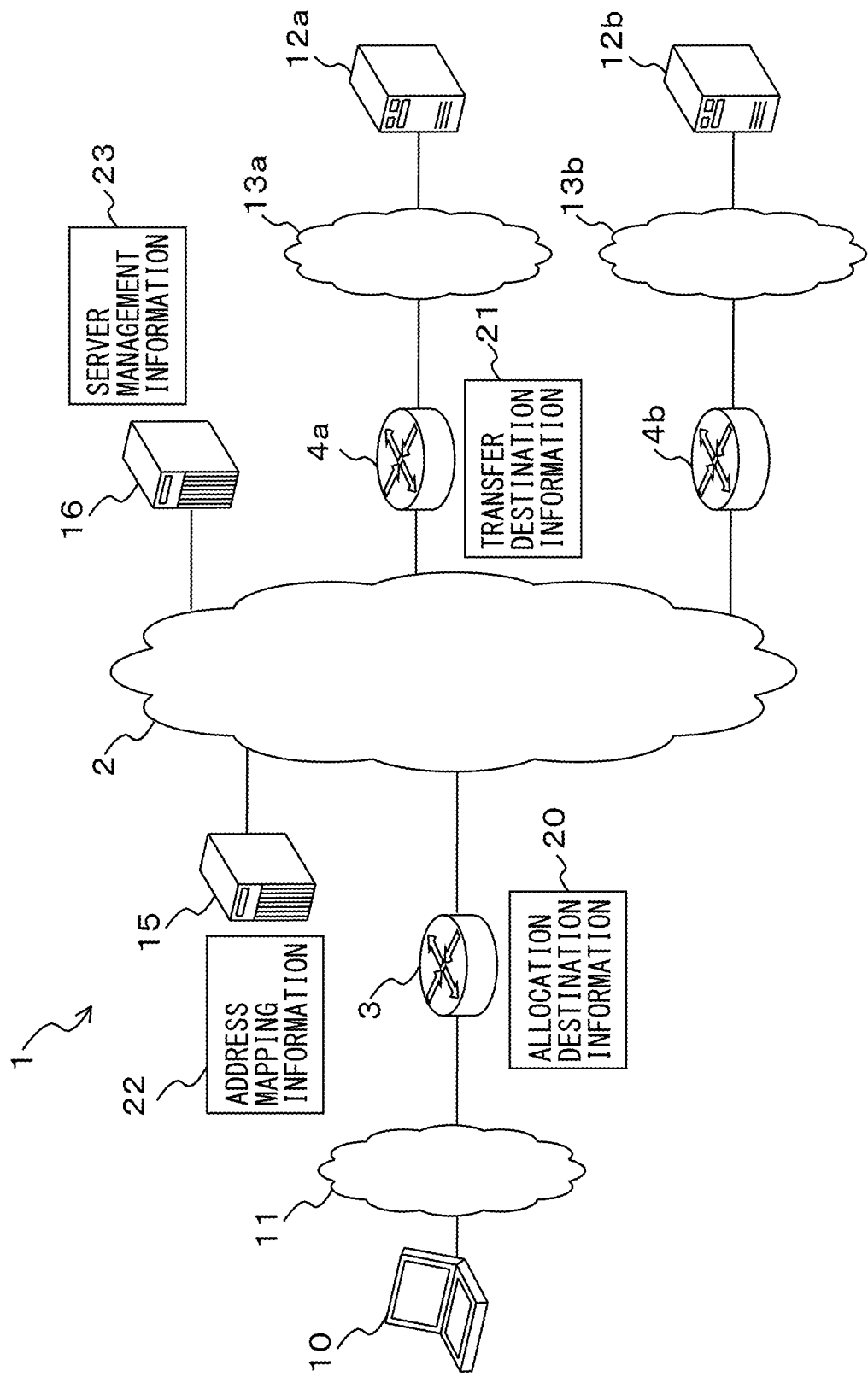
FIG. 20 is a diagram depicting a general configuration of a third example of the communication system.

Another embodiment of the communication system 1 will be illustrated. According to the present embodiment, a server managing the server 12a outputs a change request signal requesting a change of the allocation destination of a packet destined for the server 12a. FIG. 20 is a diagram depicting a general configuration of a third example of the communication system. Components of the third example which are similar to the corresponding components depicted in FIG. 11 are denoted by the same reference numerals as used in FIG. 11. Description of the same functions is omitted.

The communication system 1 includes a managing server 16. The managing server 16 transmits a change request signal requesting a change of the allocation destination of a packet to the server 12a, to the router 4a accommodating the server 12a. The managing server 16 according to a certain embodiment determines whether or not to transmit the change request signal based on the load on the server 12a. The managing server 16 according to the present embodiment generates the change request signal when the load on the server 12a exceeds a threshold. The managing server 16 has server management information 23 that is a record of the load on each server 12.

Figures 21, 22:
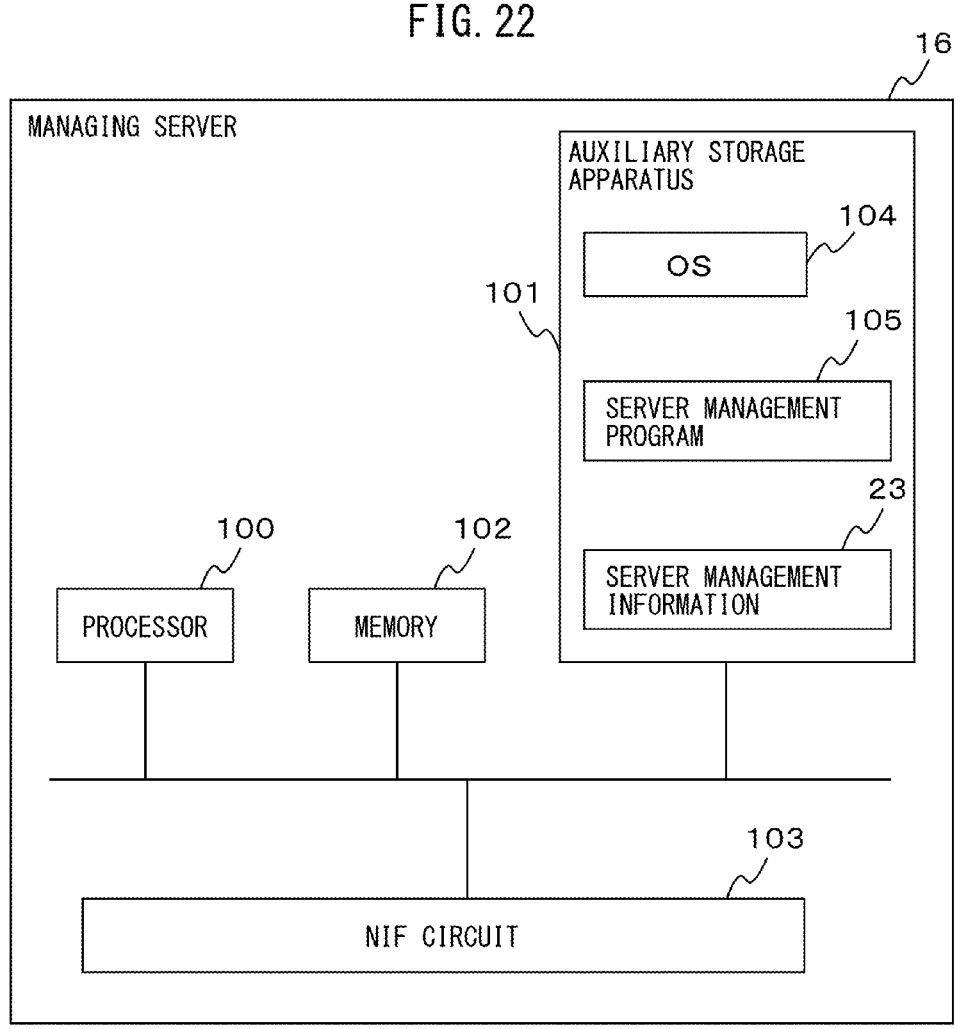
FIG. 21 is a diagram depicting an example of server management information.
FIG. 22 is a diagram depicting an example of a hardware configuration of a managing server apparatus.

FIG. 21 is a diagram of an example of the server management information 23. The server management information 23 includes information elements "address", "router address", and "load". The contents of these information elements are similar to the contents of the information elements of the load information 86 depicted in FIG. 13B. The managing server 16 monitors the load on each server 12 based on the server management information 23. When the load on the server 12a exceeds the threshold, the managing server 16 generates and transmits a change request signal to the router 4a accommodating the server 12a.

FIG. 22 is a diagram depicting an example of a hardware configuration of the managing server 16. The managing server 16 includes a processor 100, an auxiliary storage apparatus 101, a memory 102, and an NIF circuit 103.

The processor 100 performs operations of the managing server 16 described below. The auxiliary storage apparatus 101 is configured to store an operating system 104, a server management program 105 for allowing the processor 100 to perform operations illustrated below, and server management information 23. The auxiliary storage apparatus 101 includes a nonvolatile storage apparatus. The memory 102 is configured to store a computer program being currently executed by the processor 100 and data temporarily used by the program. The memory 102 may include a random access memory. The NIF circuit 103 carries out a process of transmitting and receiving packets to and from the wide area network 2.

The hardware configuration depicted in FIG. 22 is merely for illustrative purpose to describe the embodiment. Given that the managing server 16 described herein performs the operations described below, the managing server 16 may adopt any other hardware configuration.

Figure 23:
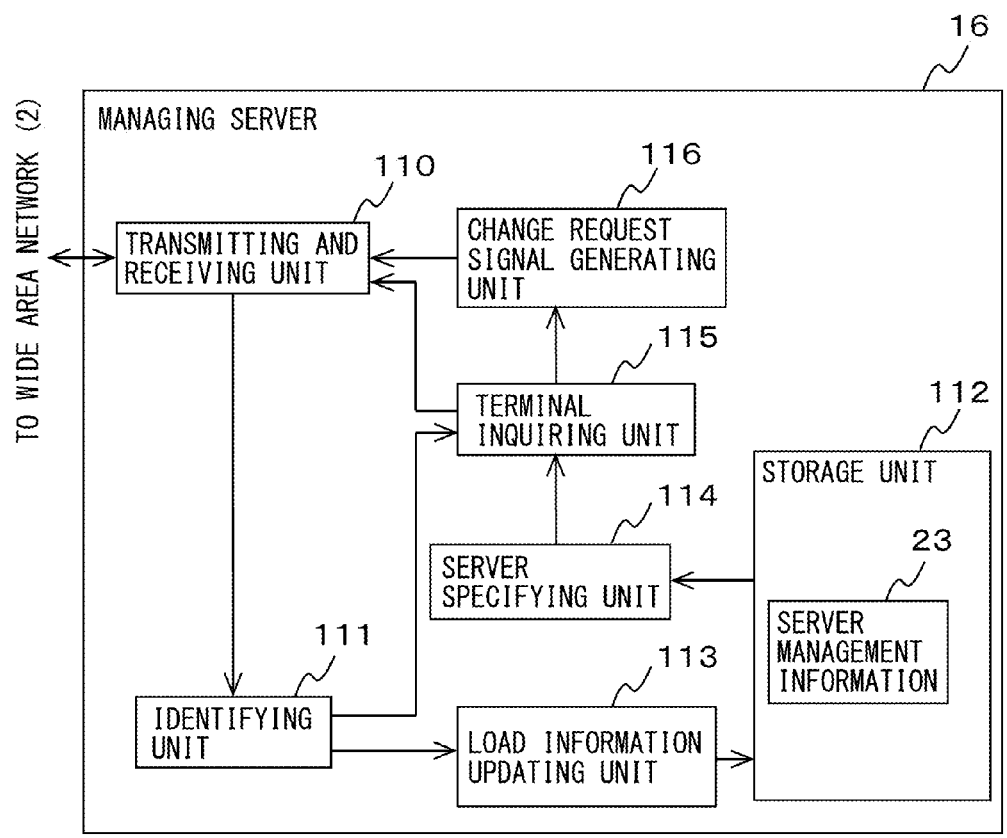
FIG. 23 is a diagram depicting an example of a functional configuration of the managing server apparatus.

FIG. 23 is a diagram depicting an example of a functional configuration of the managing server 16. The managing server 16 includes a transmitting and receiving unit 110, an identifying unit 111, a storage unit 112, a load information updating unit 113, a server specifying unit 114, a terminal inquiring unit 115, and a change request signal generating unit 116.

The transmitting and receiving unit 110 carries out a process of receiving packets from the wide area network 2 and a process of transmitting packets to the wide area network 2. The identifying unit 111 carries out a process of identifying packets received from the wide area network 2. The storage unit 112 is configured to store the server management information 23. The load information updating unit 113 updates information on the load on each server 12 recorded in the server management information 23 based on a load notification signal provided by the server 12. The load information updating unit 113 may receive the load notification signal from, for example, a load measuring agent program that operates in the server 12 to measure the load on the server 12.

Based on the server management information 23, the server specifying unit 114 specifies one of the servers 12, i.e., the server 12a, to be a server that switches the allocation destination of the packet destined for the server 12a, to another server 12b. The server specifying unit 114 specifies, for example, the server 12a in which the load recorded in the server management information 23 exceeds a threshold.

The terminal inquiring unit 115 inquires of the server 12a about the address "A" of the terminal 10 transmitting the packet to the server 12a specified by the server specifying unit 114. The change request signal generating unit 116 generates a change request signal containing designations of the address "B" of the server 12a and the address "A" of the terminal 10, and transmits the change request signal to the router 4a.

The above-described operation of the transmitting and receiving unit 110 is performed through cooperation between the NIF circuit 103 and processor 100 depicted in FIG. 22. The above-described operations of the identifying unit 111, the load information updating unit 113, the server specifying unit 114, the terminal inquiring unit 115, and the change request signal generating unit 116 are performed by the processor 100 executing the server management program 105. A storage area for the storage unit 112 is provided in the auxiliary storage apparatus 101. Furthermore, a diagram of a functional configuration in FIG. 23 mainly depicts components related to the functions of the managing server 16 illustrated herein. The managing server 16 may include components other than the depicted components.

Figure 24:
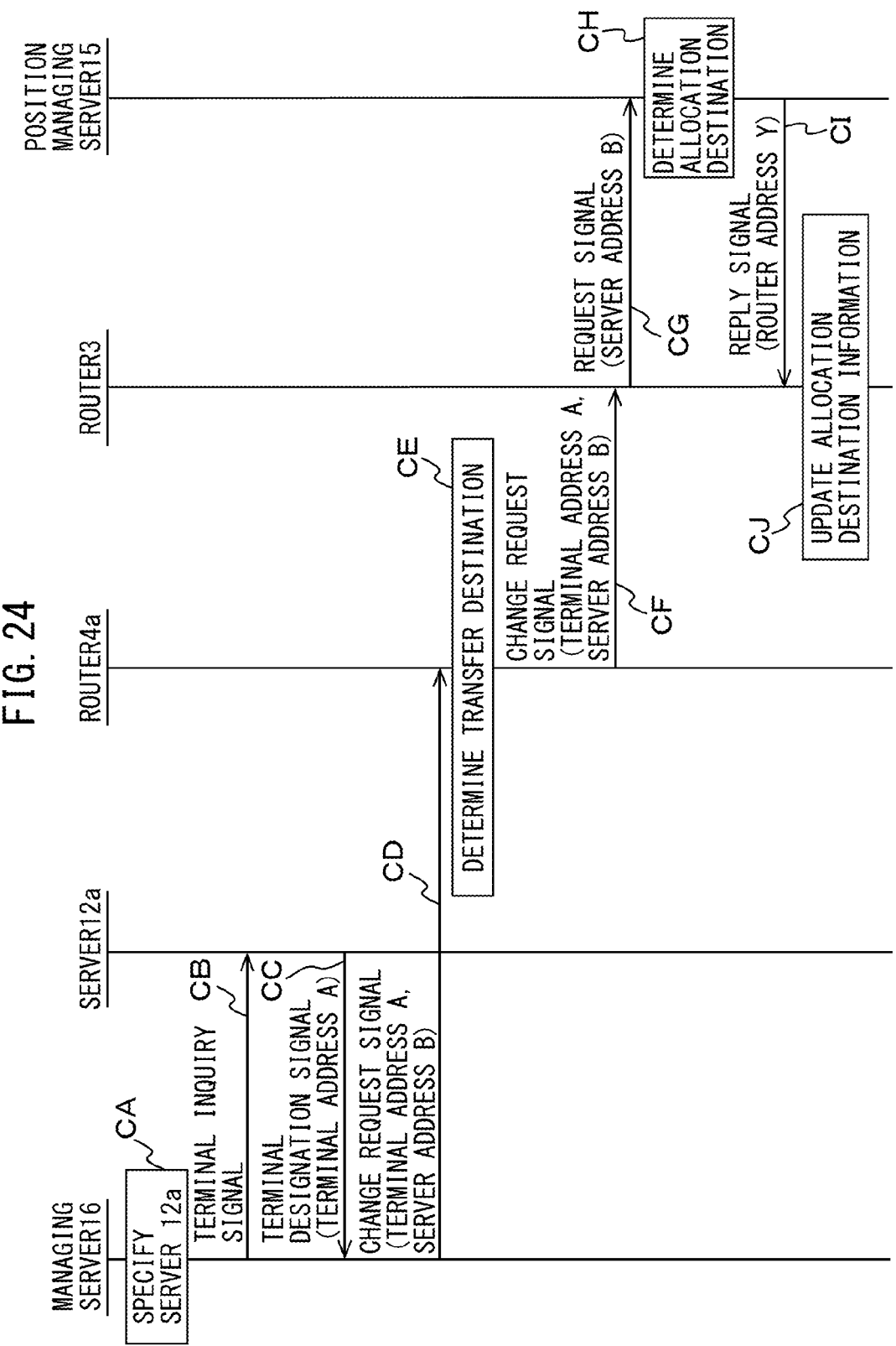
FIG. 24 is a sequence diagram illustrating a second example of the operation of changing the allocation destination of a packet.

FIG. 24 is a sequence diagram illustrating a second example of an operation of changing the allocation destination of a packet. In an operation CA, the server specifying unit 114 of the managing server 16 specifies one of the servers 12, i.e., the server 12a, to be a server that switches the allocation destination of the packet destined for the server 12a, to another server 12b. In an operation CB, the terminal inquiring unit 115 of the managing server 16 transmits a terminal inquiry signal inquiring of the server 12a about the address "A" of the terminal 10 transmitting the packet to the identified server 12a.

When receiving the terminal inquiry signal, the server 12a transmits, in an operation CC, a terminal designation signal designating the address "A" of the terminal 10 to the managing server 16. In an operation CD, the change request signal generating unit 116 of the managing server 16 transmits to the router 41, a change request signal containing designations of the address "B" of the server 12a and the address "A" of the terminal 10. Operations CE to CJ are similar to the operations BC to BH illustrated with reference to FIG. 19.

The present embodiment allows not only servers to which packets are to be allocated but also another managing apparatus managing the servers to start an operation of changing the allocation destination of each packet. Furthermore, a variation of the present embodiment allows the position managing server 15 to operate as the managing server 16. In this case, the load information 86 may be used as the server management information 23.

The variation of the position managing server 15 may determine whether or not to change the allocation destination of a packet to the server 12a based on the load information 86. When the allocation destination of the packet is changed to the server 12a, the position managing server 15 may determine the address "Y" of the router 4b, which is a new allocation destination. The position managing server 15 may transmit, to the router 3, an allocation destination indication signal containing the address "A" of the terminal 10 designated in the terminal designation signal, the address "B" of the server 12a, which is an allocation destination, and the address "Y" of the router 4b, which is a new allocation destination. The router 3 may update the allocation destination information 20 such that the destination to which the packet destined for the address "B" designated in the allocation destination indication signal matches the router 4b with the address "Y".

Furthermore, also in a fourth embodiment to a seventh embodiment illustrated below, the managing server 16 may output a change request signal as in the case with the third embodiment.

<4. Fourth Embodiment>

Another embodiment of the communication system 1 will be illustrated. A general configuration of the communication system 1 according to the present embodiment is similar to the configuration in FIG. 11. According to the present embodiment, the router 4a, when receiving a change request signal from the server 12a that is the current allocation destination, transmits, to the position managing server 15, a request signal requesting the address of the router 4 to which the packet destined for the server 12 is to be allocated.

It is assumed that when receiving the request signal, the position managing server 15 determines the allocation destination of the packet to be the router 4b. The router 4a receives a reply signal containing the address "Y" of the router 4b, which is a new allocation destination determined by the position managing server 15. The router 4a transmits, to the router 3, an allocation destination indication signal containing the address "A" of the terminal 10, the address "B" of an allocation destination server 12a, and the address "Y" of a new allocation destination router 4b. The router 3 updates the allocation destination information 20 such that the destination to which the packet destined for the address "B" designated in the allocation destination indication signal is to be allocated matches the router 4b with the address "Y".

Figure 25:
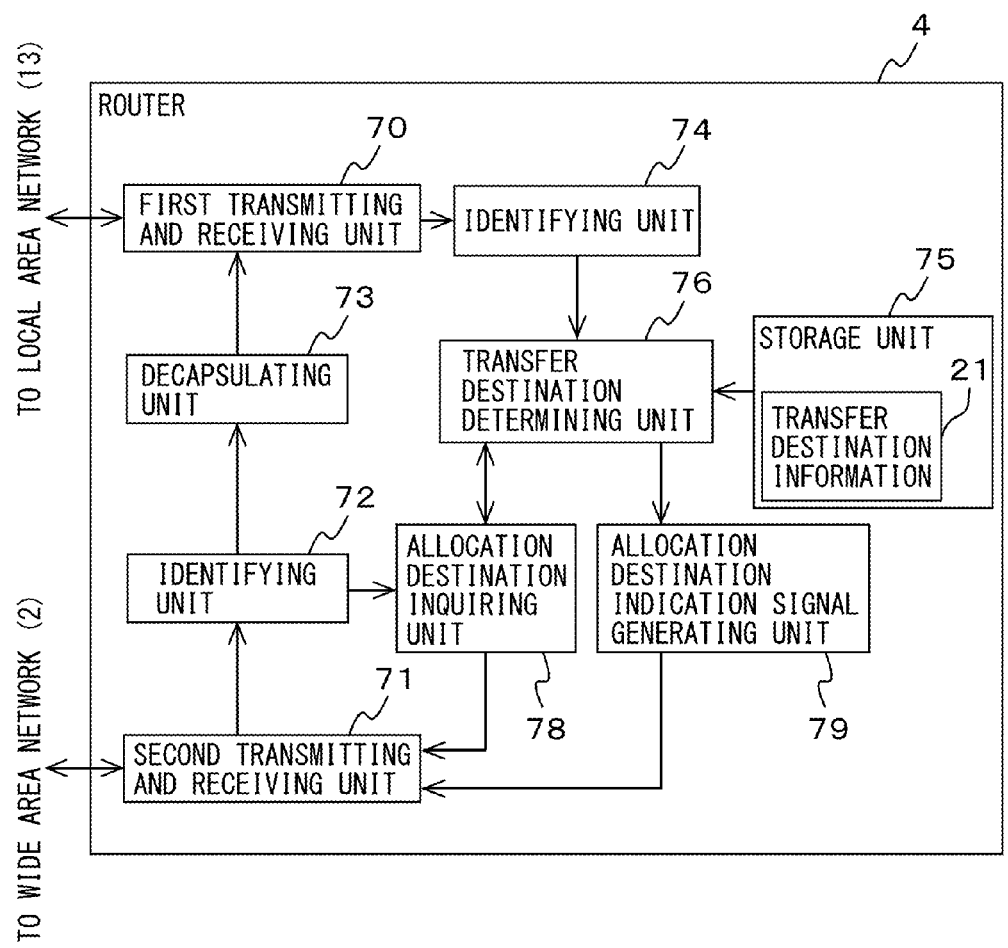
FIG. 25 is a diagram depicting a third example of the functional configuration of the router apparatus on the server apparatus side.

FIG. 25 is a diagram depicting a third example of the functional configuration of the router 4. Components of the third example which are similar to the corresponding components depicted in FIG. 16 are denoted by the same reference numerals as used in FIG. 16. Description of the same functions is omitted. The router 4 includes an allocation destination inquiring unit 78, and an allocation destination indication signal generating unit 79.

When a change request signal transmitted by the server 12 is received, the allocation destination inquiring unit 78 transmits, to the position managing server 15, a request signal requesting the address of the router 4 to which the packet destined for the server designated in the change request signal is to be allocated. Furthermore, the allocation destination inquiring unit 78 receives a reply signal transmitted by the position managing server 15 in response to the request signal. The allocation destination inquiring unit 78 outputs the address of a new allocation destination router 4 designated in the reply signal, to the transfer destination determining unit 76.

The transfer destination determining unit 76 outputs, to the allocation destination indication signal generating unit 79, the address of the router 3 to which the packet from the terminal 10 is to be allocated and which is identified based on the address of the terminal 10, the address of the server 12, the address of a new allocation destination router 4, and the transfer destination information 21. The allocation destination indication signal generating unit 79 generates an allocation destination indication signal containing the address of the terminal 10, the address of the server 12, and the address of the new allocation destination router 4.

The allocation destination indication signal generating unit 79 designates the address of the router 3 as the destination address of the allocation destination indication signal. The allocation destination indication signal generating unit 79 transmits the allocation destination indication signal to the router 3. The above-described operations of the allocation destination inquiring unit 78 and the allocation destination indication signal generating unit 79 are performed by the processor 40 depicted in FIG. 5, executing the control program 46.

Figure 26:
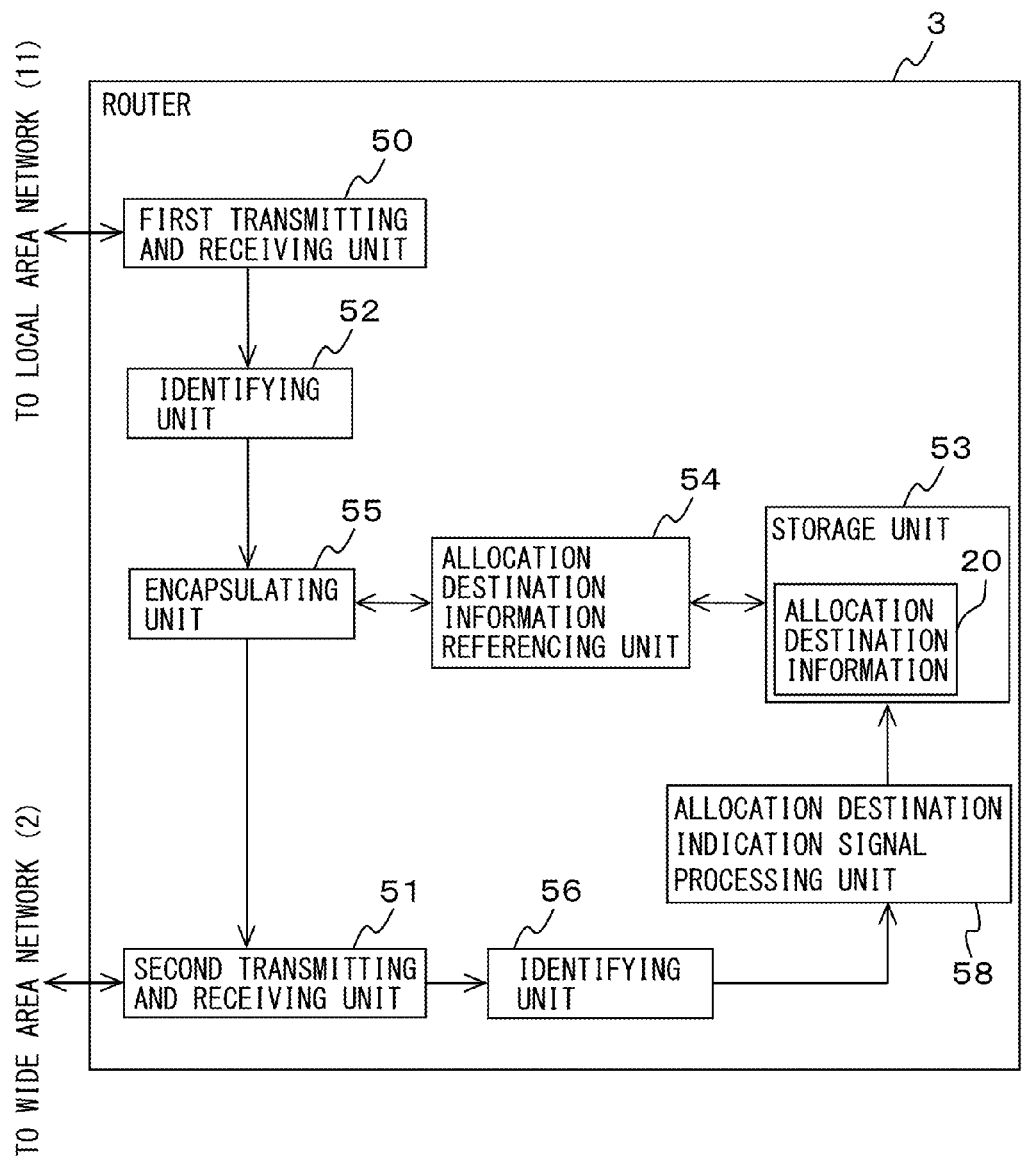
FIG. 26 is a diagram depicting a third example of the functional configuration of the router apparatus on the terminal apparatus side.

FIG. 26 is a diagram depicting a third example of the functional configuration of the router 3. Components of the third example which are similar to the corresponding components depicted in FIG. 17 are denoted by the same reference numerals as used in FIG. 17. Description of the same functions is omitted. The router 3 includes an allocation destination indication signal processing unit 58. The allocation destination indication signal processing unit 58 receives the allocation destination indication signal transmitted by the router 4.

The allocation destination indication signal processing unit 58 updates the allocation destination information 20 such that the destination to which the packet destined for the address of the server 12 designated in the allocation destination indication signal is to be allocated matches the address of the router 4 designated as a new allocation destination. The above-described operation of the allocation destination indication signal processing unit 58 is performed by the processor 30 depicted in FIG. 4, executing the control program 36.

Figure 27:
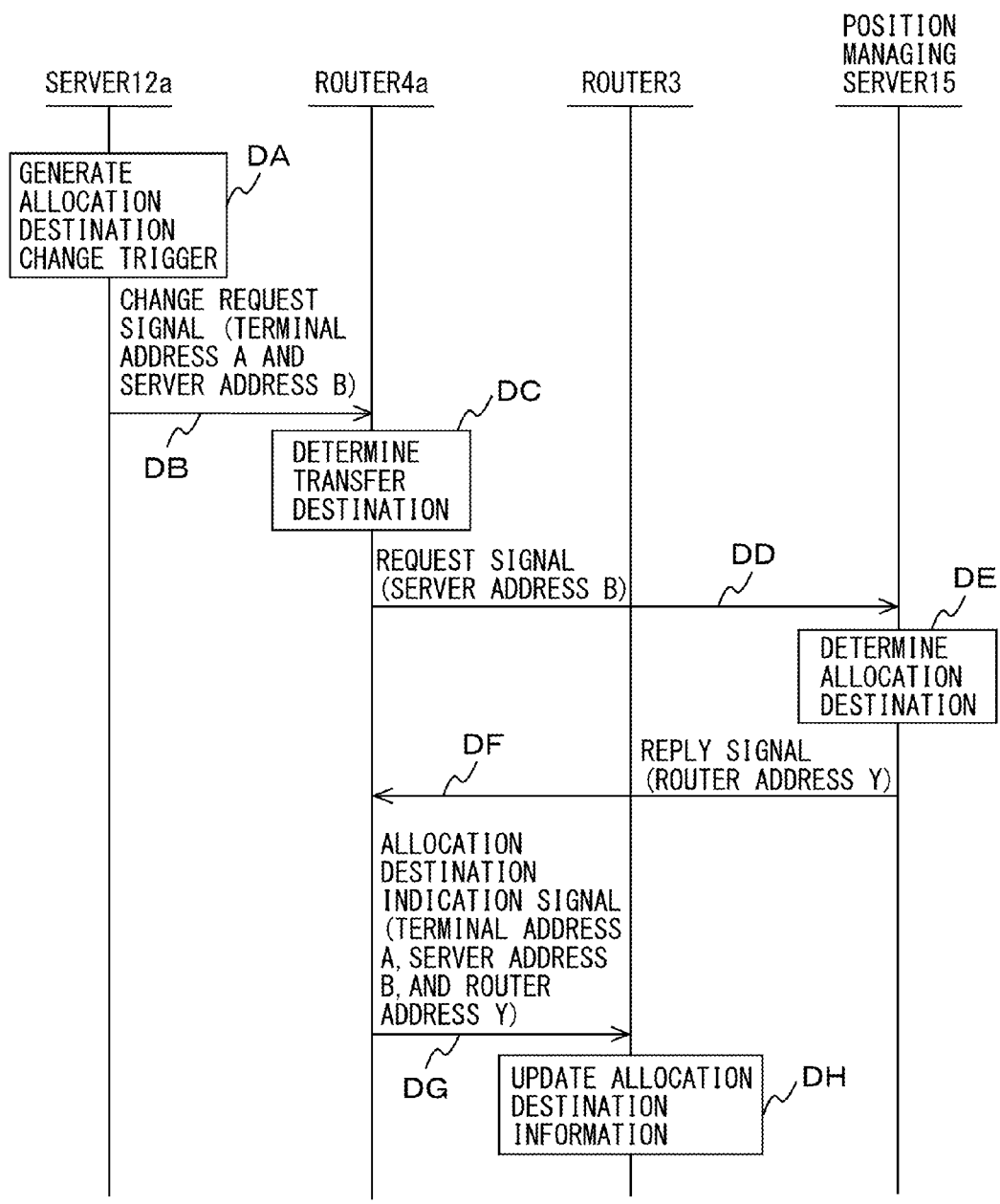
FIG. 27 is a sequence diagram illustrating a third example of the operation of changing the allocation destination of a packet.

FIG. 27 is a sequence diagram illustrating a third example of the process of changing the allocation destination of a packet. Operations DA to DC are similar to the operations BA to BC illustrated with reference to FIG. 19.

In an operation DD, the allocation destination inquiring unit 78 of the router 4a transmits, to the position managing server 15, a request signal requesting the address of the router 4 to which the packet destined for the server 12 with the address "B" designated in the change request signal is to be allocated. In an operation DE, the allocation destination determining unit 93 of the position managing server 15 selects the router 4b as a new destination to which the packet destined for the server 12 with the address "B" is to be allocated. In an operation DF, the allocation destination determining unit 93 transmits, to the router 4a, a reply signal containing the address "Y" of the router 4b to which the packet is to be allocated.

In an operation DG, the allocation destination indication signal generating unit 79 of the router 4a transmits, to the router 3, an allocation destination indication signal containing the address "A" of the terminal 10, the address "B" of the server 12, and the address "Y" of the new allocation destination router 4. In an operation DH, the allocation destination indication signal processing unit 58 of the router 3 updates the allocation destination information 20 such that the destination to which the packet destined for the server 12 with the address "B" is to be allocated matches the router 4b designated in the reply signal.

According to the present embodiment, the router 4, when receiving a change request signal, carries out a process of inquiring of the position managing server 15 about the address of the router 4 to which a packet destined for the server 12 is to be allocated and which encapsulates the packet and transfers the encapsulated packet. This eliminates the need to transfer a change request signal from the router 4 to the router 3 in the wide area network 2, reducing the load on the wide area network 2. Furthermore, the need for an inquiry to the position managing server 15 is eliminated, reducing the processing load on the router 3.

<5. Fifth Embodiment>

Another embodiment of the communication system 1 will be illustrated. A general configuration of the communication system 1 according to the present embodiment is similar to the configuration in FIG. 11. According to the present embodiment, the server 12a transmits, to the position managing server 15, a change request signal requesting a change, to the server 12a, of the destination to which the packet is allocated. When receiving a change request signal designating the addresses "A" and "B" of the terminal 10 and the server 12, the position managing server 15 determines the address "Y" of the router 4b, which is a new allocation destination to which a packet from the terminal 10 is to be allocated. Furthermore, the position managing server 15 identifies the address "Z" of the router 3 accommodating the address "A" of the terminal 10 based on the address mapping information 22.

The position managing server 15 transmits, to the router 3 with the address "Z", an allocation destination indication signal containing the address "A" of the terminal 10, the address "B" of an allocation destination server 12a, and the address "Y" of a new allocation destination router 4b. The router 3 updates the allocation destination information 20 such that the destination to which the packet destined for the address "B" designated in the allocation destination indication signal is to be allocated matches the router 4b with the address "Y".

Figure 28:
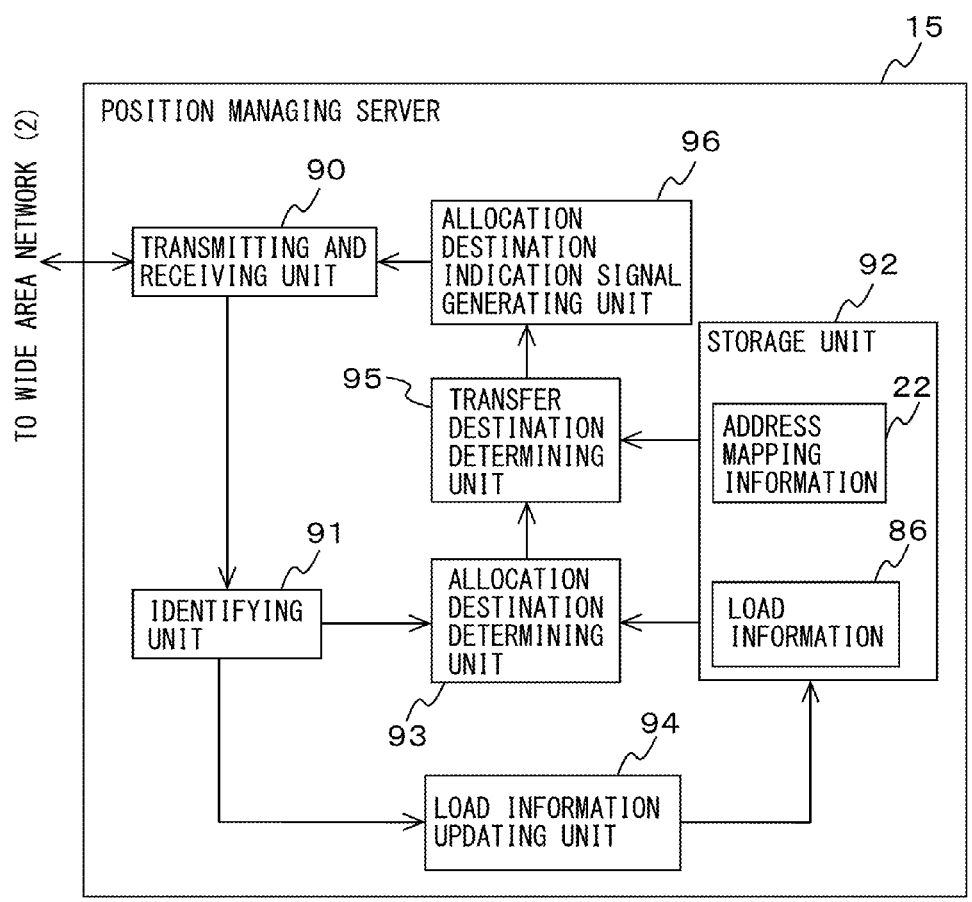
FIG. 28 is a diagram depicting a second example of the functional configuration of the position managing server apparatus.

FIG. 28 is a diagram depicting a second example of the functional configuration of the position managing server 15. Components of the second example which are similar to the corresponding components depicted in FIG. 18 are denoted by the same reference numerals as used in FIG. 18. A description of the same functions is omitted. The position managing server 15 includes a transfer destination determining unit 95 and an allocation destination indication signal generating unit 96.

When a change request signal transmitted by the server 12 is received via the local area network 13 and the wide area network 2, the allocation destination determining unit 93 references the address mapping information 22 stored in the storage unit 92. The allocation destination determining unit 93 acquires, from the address mapping information 22, the addresses of the routers 4 associated with the address of the server designated in the change request signal. The allocation destination determining unit 93 determines one of the acquired addresses to be the address of the new allocation destination router 4. The allocation destination determining unit 93 outputs the addresses of the terminal 10 and the server 12 and the address of the new allocation destination router 4 to the transfer destination determining unit 95.

The transfer destination determining unit 95 acquires, from the address mapping information 22, the address of the router 3 associated with the address of the terminal 10 designated in the change request signal. The transfer destination determining unit 95 outputs, to the allocation destination indication signal generating unit 96, the addresses of the terminal 10, the server 12, and the router 4 received from the allocation destination determining unit 93 and the address of the router 3 acquired from the address mapping information 22.

The allocation destination indication signal generating unit 96 generates an allocation destination indication signal containing the address of the terminal 10, the address of the server 12, and the address of the new allocation destination router 4. The allocation destination indication signal generating unit 96 designates the address of the router 3 in the destination address in the allocation destination indication signal. The allocation destination indication signal generating unit 96 transmits the allocation destination indication signal to the router 3. The above-described operations of the transfer destination determining unit 95 and the allocation destination indication signal generating unit 96 are performed by the processor 80 depicted in FIG. 15, executing the position management program 86.

Figure 29:
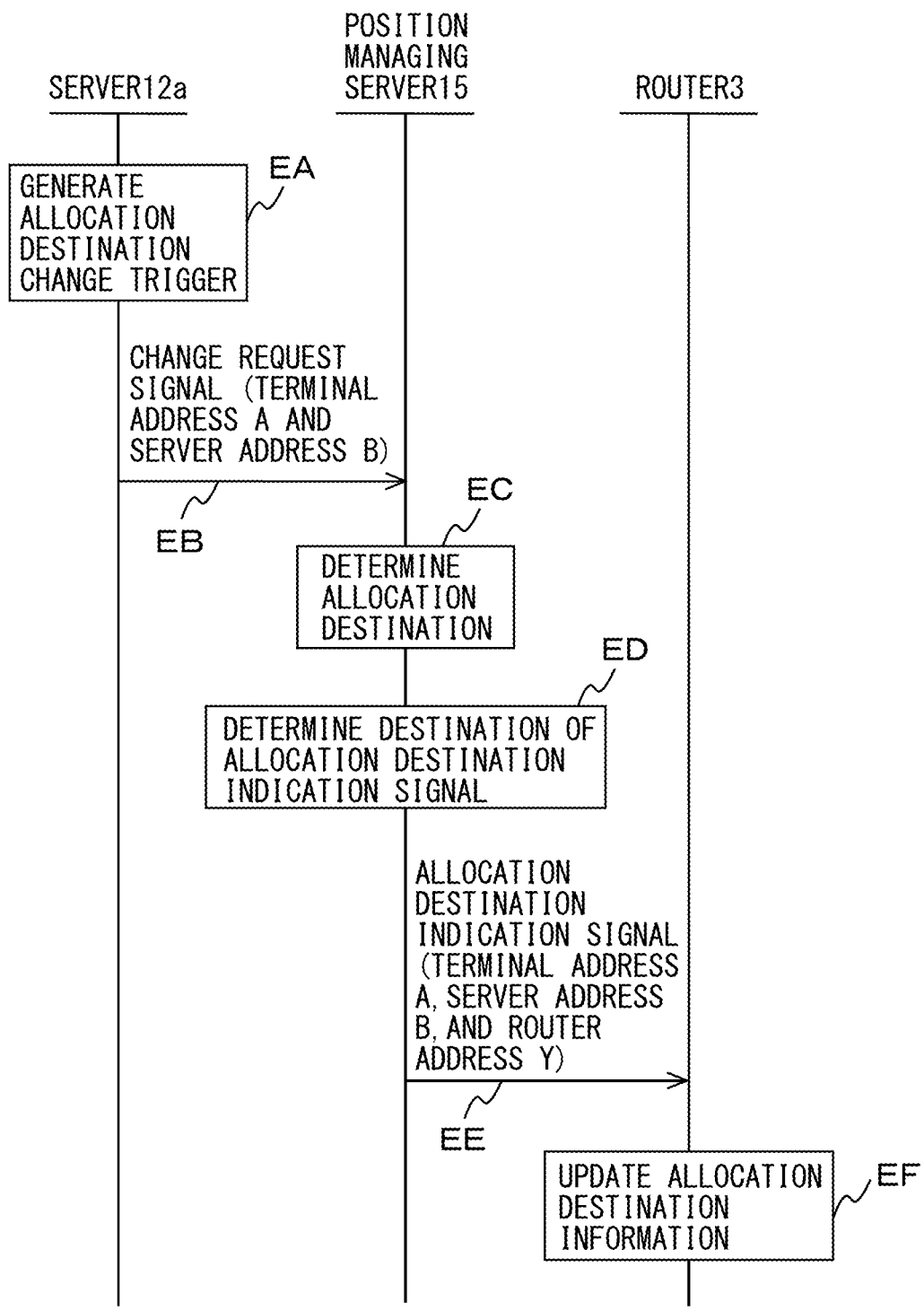
FIG. 29 is a sequence diagram illustrating a fourth example of the operation of changing the allocation destination of a packet.

FIG. 29 is a sequence diagram illustrating a fourth example of the operation of changing the allocation destination of a packet. An operation EA is similar to the operation BA illustrated with reference to FIG. 19. In an operation EB, the server 12 transmits a change request signal to the position managing server 15. The change request signal contains the address "B" of the server 12a and the address "A" of the terminal 10.

In an operation EC, the allocation destination determining unit 93 of the position managing server 15 selects the address "Y" of the router 4b as the address of the new allocation destination router 4 to which the packet destined for the server 12 with the address "B" designated in the change request signal is to be allocated. In an operation ED, the transfer destination determining unit 95 of the position managing server 15 determines the address "Z" of the router 3 associated with the address "A" of the terminal 10 to be the destination of the allocation destination indication signal based on the address mapping information 22.

In an operation EE, the allocation destination indication signal generating unit 96 transmits, to the router 3, an allocation destination indication signal containing the address "A" of the terminal 10, the address "B" of the server 12, and the address "Y" of the new allocation destination router 4. In an operation EF, the allocation destination indication signal processing unit 58 of the router 3 updates the allocation destination information 20 such that the destination to which the packet destined for the server 12 with the address "B" matches the router 4b designated in the reply signal.

According to the present embodiment, the position managing server 15 receives a change request signal from the server 12 and transmits the address of the router 4 to which a packet destined for the server 12 is to be allocated, to the router 3. This eliminates the need for a process of transferring the change request signal from the router 4 to the router 3 and a process of inquiring, by the router 4 or the router 3, about the new allocation destination router 4. As a result, the load on the router 4 or the router 3 is reduced.

<6. Sixth Embodiment>

Another embodiment of the communication system 1 will be illustrated. A general configuration of the communication system 1 according to the present embodiment is similar to the configuration in FIG. 11. According to the present embodiment, when the terminal 10 starts accessing the server 12, the router 3 inquires of the position managing server 15 about the router 4 to which a packet from the terminal 10 is to be allocated.

Figure 30:
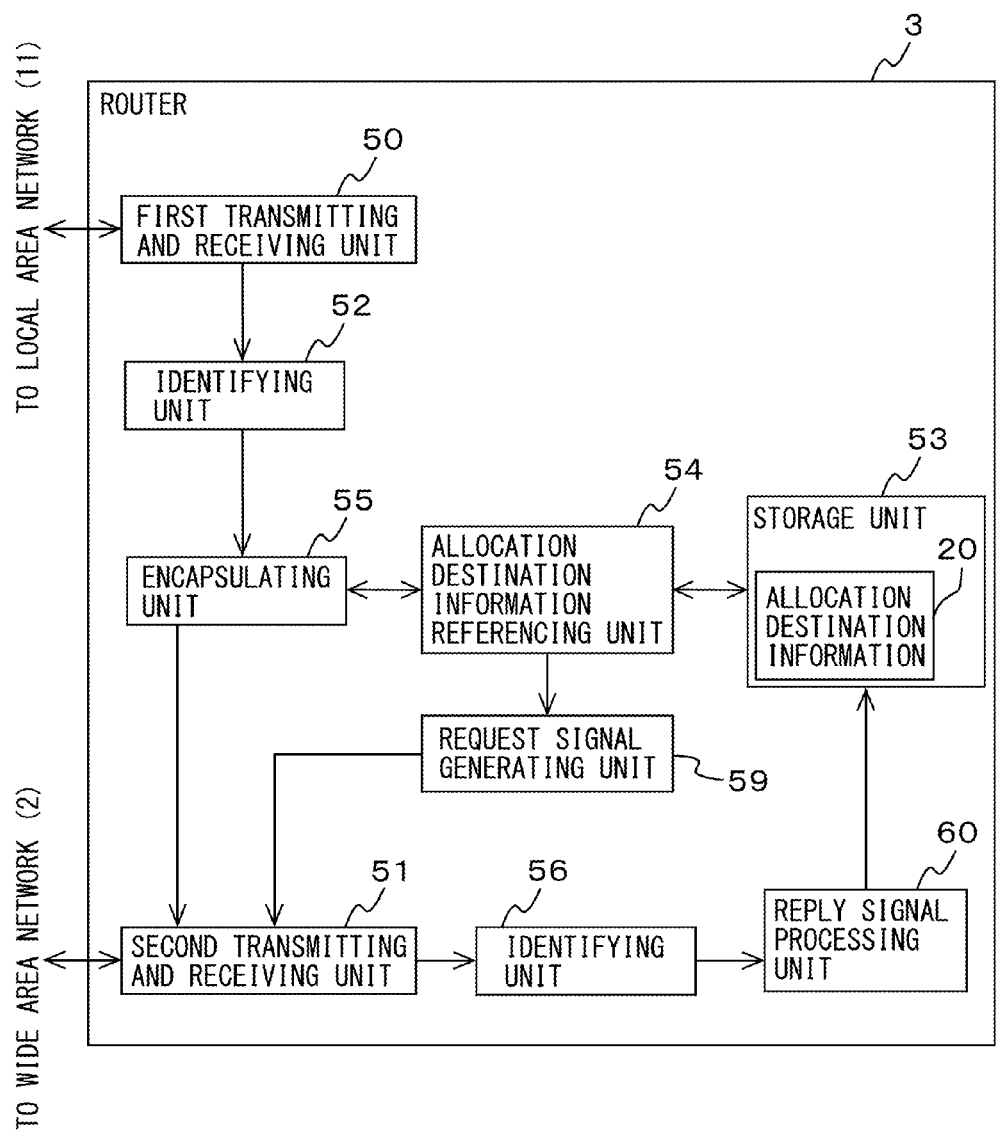
FIG. 30 is a diagram depicting a fourth example of the functional configuration of the router apparatus on the terminal apparatus side.

FIG. 30 is a diagram depicting a fourth example of the functional configuration of the router 3. Components of the fourth example which are similar to the corresponding components depicted in FIG. 17 are denoted by the same reference numerals as used in FIG. 17. Description of the same functions is omitted. The router 3 includes a request signal generating unit 59 and a reply signal processing unit 60.

When the router 3 receives a packet transmitted from the terminal 10 to the server 12, the allocation destination information referencing unit 54 acquires from the allocation destination information 20, the address of an allocation destination router 4 that corresponds to the destination address of the received packet. When the address of the allocation destination router 4 that corresponds to the destination address is not recorded in the allocation destination information 20, the request signal generating unit 59 transmits a request signal to the position managing server 15.

In response to the request signal, the reply signal processing unit 60 receives a reply signal transmitted by the position managing server 15. The reply signal processing unit 60 adds the association of the destination address of the received packet with the address of the router 4 designated in the reply signal, to the allocation destination information 20. The above-described operations of the request signal generating unit 59 and the reply signal processing unit 60 are performed by the processor 30 depicted in FIG. 4, executing the control program 36.

Figure 31:
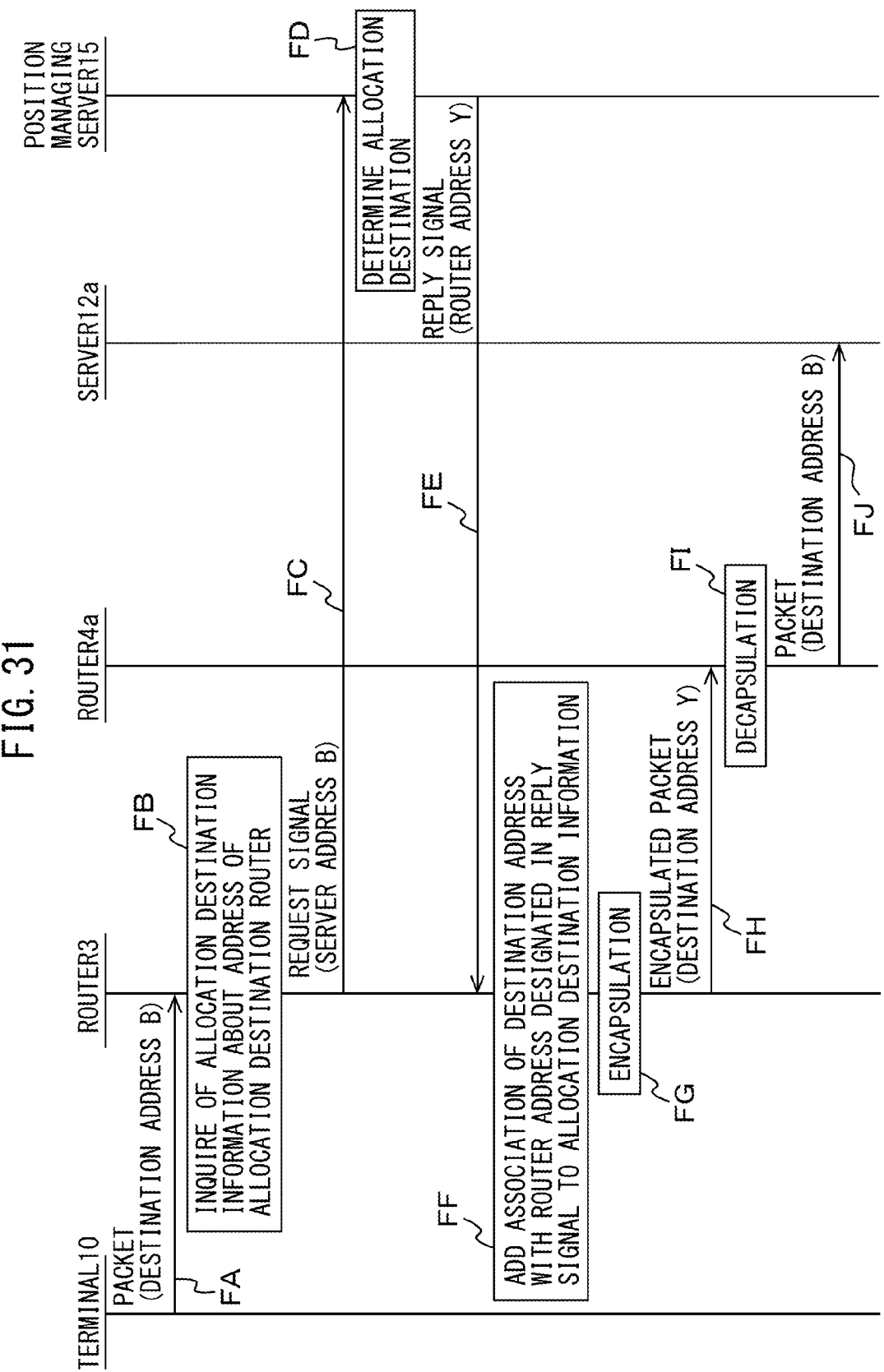
FIG. 31 is a sequence diagram illustrating an example of an operation of setting the allocation destination of a packet.

FIG. 31 is a sequence diagram illustrating an example of an operation of setting the allocation destination of a packet. It is assumed that the allocation destination information 20 on the router 3 is empty. In an operation FA, the terminal 10 transmits a packet destined for the server 12. The address "B" of the server 12 is designated as the destination address of the packet.

In an operation FB, the allocation destination information referencing unit 54 of the router 3 acquires the address of the allocation destination router 4 corresponding to the destination address "B" of the received packet, from the allocation destination information 20. When the address of the allocation destination router 4 that corresponds to the destination address "B" of the received packet is not recorded in the allocation destination information 20, the request signal generating unit 59 of the router 3 transmits, in an operation FC, a request signal to the position managing server 15. The request signal contains a designation of the address "B" of the server 12.

In an operation FD, allocation destination determining unit 93 of the position managing server 15 determines the address "Y" of the router 4b, to which the packet destined for the server 12 with the address "B" is to be allocated. In an operation FE, the allocation destination determining unit 93 transmits, to the router 3, a reply signal containing the determined address "Y" of the router 4b, which is an allocation destination.

In an operation FF, the reply signal processing unit 60 adds the association of the destination address of the received packet with the address of the router 4 designated in the reply signal, to the allocation destination information 20. Operations FG to FJ are similar to the operations AC to AF illustrated with reference to FIG. 8.

The present embodiment provides a configuration and a method which determines which of the servers providing the same service a packet is to be allocated by encapsulation when a terminal starts accessing one of the servers. Furthermore, like the second embodiment, the present embodiment determines the allocation destination server according to the loads on the servers. Thus, when the terminal starts access, the allocation destination can be determined according to the load status of each server.

<7. Seventh Embodiment>

Figure 32:
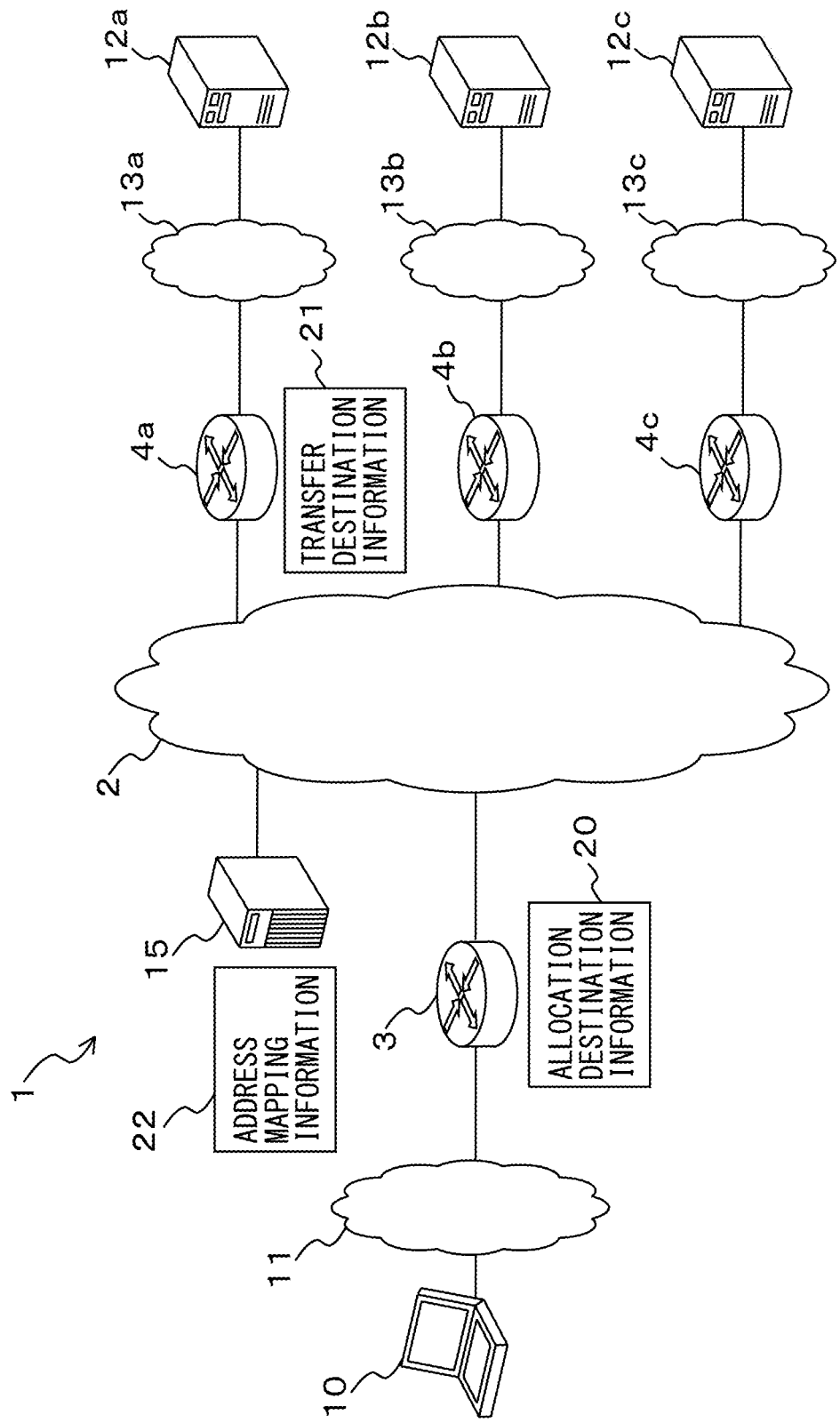
FIG. 32 is a diagram depicting a general configuration of a fourth example of the communication system.

Another embodiment of the communication system 1 will be illustrated. FIG. 32 is a diagram depicting a general configuration of a fourth example of the communication system 1. Components of the fourth example which are similar to the corresponding components depicted in FIG. 11 are denoted by the same reference numerals as used in FIG. 11. Description of the same functions is omitted. The communication system 1 includes a plurality of routers 4a to 4c. The plurality of routers 4a to 4c are edge routers that connect the respective plurality of local area networks 13a to 13c with the respective plurality of servers 12a to 12c connected thereto, to the wide area network 2. In the description below, the servers 12a to 12c, the local area networks 13a to 13c, and the routers 4a to 4c are hereinafter sometimes collectively referred to as the "server 12", the "local area network 13", and the router 4", respectively.

According to the present embodiment, information on the load on the server 12a is contained in the change request signal and the request signal requesting a change of the allocation destination of a packet transmitted from the terminal 10 to the server 12a. The position managing server 15 selects the router 4 to which the packet from the terminal 10 is to be allocated, from those of the plurality of routers 4 accommodating the server 12 which have a lower load than the server 12a.

It is assumed that the address mapping information 22 and the load information 86 stored in the position managing server 15 are as depicted in FIG. 33A and FIG. 33B. The plurality of servers 12a to 12c with the address "B" are accommodated in the plurality of routers 4a to 4c with the addresses "X", "Y", and "Z", respectively. Furthermore, the loads on the servers 12a to 12c are "20", "15", and "22", respectively. The load on the server 12a specified in the request signal is also assumed to be "20".

The position managing server 15 selects, as the address of the routers 4 to which the packet from the terminal 10 is to be allocated, the address "Y" of the router 4b, included in the routers 4 accommodating the servers 12 and accommodating the server 12b with the load of "15", which is lower than the load "20" on the server 12a.

Selection of the server 12b, having a lower load than the server 12a, allows the server 12c, having a higher load than the server 12a, which has been an allocation destination before a change, to be selected as a new allocation destination. This enables a reduction in the risk of service quality degradation. Similarly, also in the third embodiment to the fifth embodiment, the change request signal and the request signal may contain information on the load on the server 12a, and the position managing server 15 may select the server 12 having a lower load than the server 12a as an allocation destination.

Figure 34:
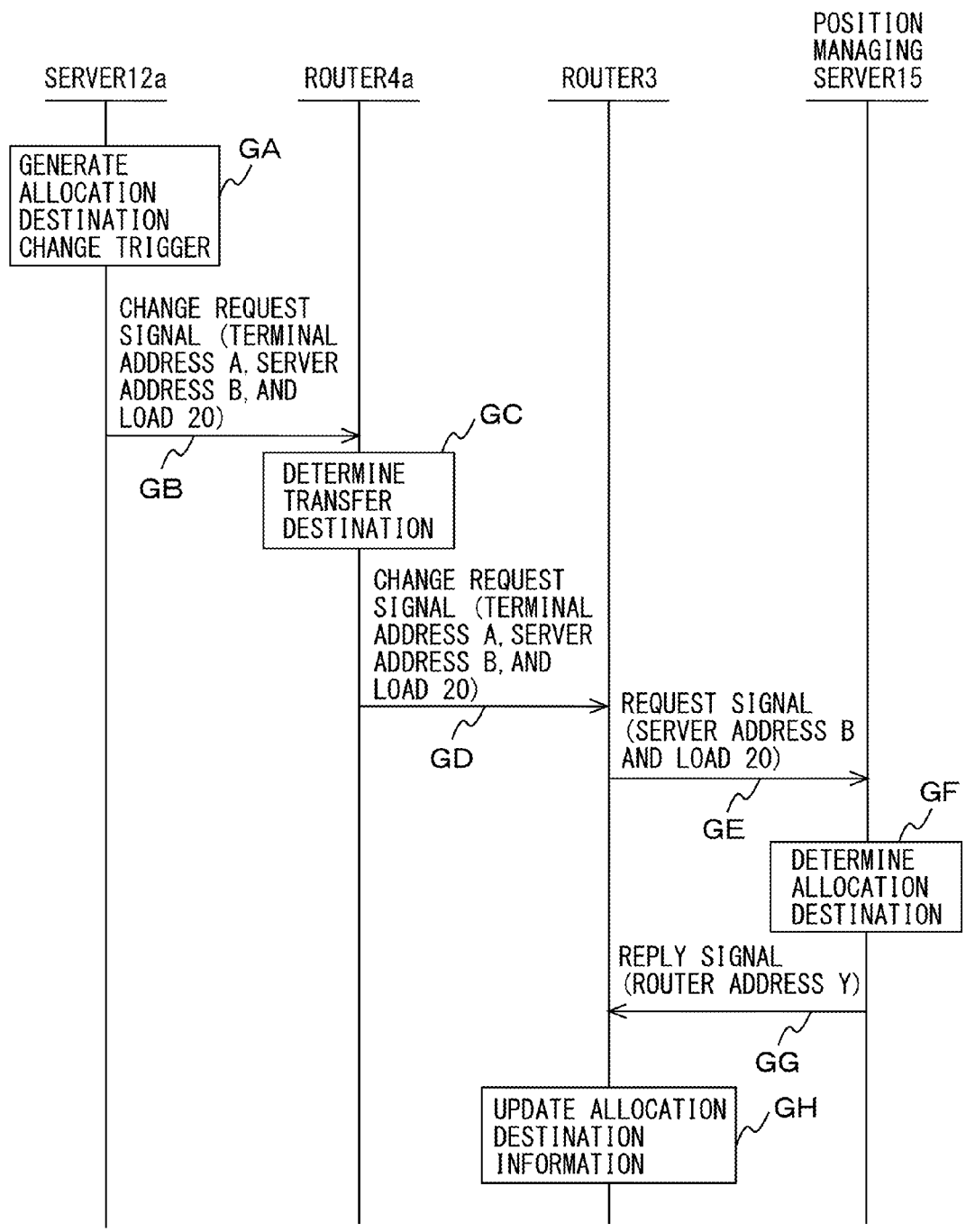
FIG. 34 is a sequence diagram illustrating a fifth example of the operation of changing the allocation destination of a packet.

FIG. 34 is a sequence diagram illustrating a fifth example of the operation of changing the allocation destination of a packet. An operation GA is similar to the operation BA illustrated with reference to FIG. 19. In an operation GB, the server 12a transmits a change request signal to the router 4a. The change request signal contains designations of the address "B" of the server 12a and the address "A" of the terminal 10 and information "20" on the load on the server 12a. Operations GC and GD are similar to the operations BC and BD illustrated with reference to FIG. 19.

In an operation GE, the allocation destination referencing unit 57 of the router 3 transmits a request signal to the position managing server 15 to request the address of the router 4 to which a packet destined for the server 12 with the address "B" designated in the change request signal is to be allocated. The change request signal contains designations of the address "B" of the server 12a and the information "20" on the load on the server 12a.

In an operation GF, the allocation destination determining unit 93 of the position managing server 15 determines the address of the router 4 to which the packet destined for the server 12 with the address "B" is to be allocated. At this time, the allocation destination determining unit 93 selects the address of the router 4b, included in the routers 4 accommodating the servers 12 and accommodating the server 12 having a load lower than the load of "20" on the server 12a. When a plurality of servers 12 has a lower load than the server 12a, the allocation destination determining unit 93 may use a round-robin method or the like to select one of the plurality of servers 12 having a lower load than the server 12a. Alternatively, the allocation destination determining unit 93 may preferentially select one of a plurality of servers 12 having a lower load than the server 12a that has a lower load. Operations GG and GH are similar to the operations BG and GH illustrated with reference to FIG. 19.

The present embodiment can reduce the risk of degradation of service quality resulting from the selection, as a new allocation destination, of the server 12 having a higher load than the server 12a, which has been an allocation destination before the change. The possibility of selecting the server 12 having a higher load than the server 12a is further reduced by containing the latest information on the load on the server 12a in the request signal and the change request signal requesting a change of the allocation destination of the packet to be transmitted to the server 12a.

Furthermore, the position managing server 15 may be modified to include a load information requesting unit which requests the plurality of servers 12 to transmit information on the respective loads when a request signal is received which requests the address of the router 4 to which the packet destined for the server 12 is to be allocated.

According to the device and method disclosed herein, a packet allocation process enabling a change of an allocation destination server apparatus without changing the address of server apparatuses visible to the terminal apparatus is distributed among a plurality of apparatuses.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A router apparatus connecting a first network and a second network, the router apparatus comprising:
a storage unit which stores association information, the association information associates an address of one of a plurality of second router apparatuses, having different addresses from each other, with an address of a corresponding one of a plurality of server apparatuses, each of the server apparatuses is assigned the same address, where the second router apparatuses are connected, on one hand, to the first network and, on the other hand, to the server apparatuses via respective third networks;
a receiving unit which receives a packet transmitted from a terminal apparatus and transferred via the first network;
a processor which encapsulates a packet received from the terminal apparatus and transferred, via the second network and one of the third networks, to one of the server apparatuses, into a packet which is transmitted, via the second network, to one of the second router apparatuses and has a destination address corresponding to an address of that second router apparatus associated with an address of the packet received from the terminal apparatus, based on the association information; and
a transmitting unit which transmits the packet encapsulated by the processor to the first network.

2. The router apparatus according to claim 1, further comprising an address changing unit which switches the address associated with the address of the server apparatus based on the association information, among the plurality of second router apparatuses.

3. The router apparatus according to claim 2, wherein the address changing unit comprises an address inquiring unit which inquires of an address storage apparatus about the address of one of the plurality of second router apparatuses connecting each of the plurality of third networks to the first network, the address storage apparatus storing the addresses of the plurality of second router apparatuses.

4. The router apparatus according to claim 2, further comprising a second receiving unit which receives an indication signal indicating the address of the server apparatus and the address of the second router apparatus with which the address of the server apparatus is associated, wherein the address changing unit changes the address associated with the address of the server apparatus based on the association information to the address of the second router apparatus indicated in the indication signal.

5. The router apparatus according to claim 1, further comprising an address inquiring unit which inquires of the address storage apparatus storing the addresses of the plurality of second routers about the address of the one of the plurality of second router apparatuses connecting the first network to the plurality of third networks to which the respective plurality of server apparatuses with the same address to the destination address of the packet received by the receiving unit is connected; and an association information generating unit which generates the association information associating the address associated with the address of the server apparatus with the address of the second router apparatus received from the address storage apparatus and which stores the association information in the storage unit.

6. A router apparatus comprising:

a receiving unit which receives a first packet from a first router apparatus via a first network, where the first router apparatus encapsulates the first packet which is received from a terminal apparatus and transferred, via the first network, a second server, having different addresses from each other, and one of third networks, to one of a plurality of server apparatuses, into a second packet which is transmitted, via the first network, to the one of second router apparatuses and has a destination address corresponding to the address of that second router apparatus;

a processor which takes out, from the second packet encapsulated, the first packet transmitted by the terminal apparatus connected to a second network and destined for one of the plurality of server apparatuses connected to respective third networks, each of the server apparatuses is assigned the same address; and a transmitting unit which transmits the packet taken out by the processor to the third network connected to the first network by the router apparatus.

7. The router apparatus according to claim 6, further comprising:

a storage unit which stores association information associating an address of the terminal apparatus with an address of the first router apparatus;

a second receiving unit which receives a change request signal requesting a change of the destination of the packet from the terminal apparatus to another of the plurality of server apparatuses, from the server apparatus connected to the third network connected to the first network by a second router apparatus;

an address inquiring unit which inquires of an address storage apparatus storing addresses of a plurality of the second router apparatuses connecting each of the plurality of third networks to the first network about the address of one of the plurality of second router apparatuses; and a second transmitting unit which transmits the address received from the address storage apparatus to the address of the first router apparatus associated, based on the association information, with the address of the terminal apparatus designated in the change request signal.

8. A communication system comprising:

a first network;

a first router apparatus connecting a second network to the first network; and a plurality of second router apparatuses, having different addresses from each other, connecting each of a plurality of third networks to the first network, wherein the first router apparatus comprises:

a storage unit which stores association information, the association information associates an address of one of the plurality of second router apparatuses with an address of a corresponding one of a plurality of server apparatuses, each of the server apparatuses is assigned the same address, where the second router apparatuses are connected, on one hand, to the first network and, on the other hand, to the server apparatuses via respective third networks;

a first receiving unit which receives a packet transmitted from a terminal apparatus and transferred via the second network;

a first processor which encapsulates a first packet received from the terminal apparatus and transferred, via the first network and one of the third networks, to one of the server apparatuses, into a second packet which is transmitted, via the first network, to one of the second router apparatuses and has a destination address corresponding to an address of that second router apparatus associated with an address of the packet received from the terminal apparatus, based on the association information; and a first transmitting unit which transmits the second packet encapsulated by the first processor to the first network, and each of the second router apparatuses comprises:

a second receiving unit which receives a second packet from the first router apparatus via the first network, where the first router apparatus encapsulates the first packet which is received from the terminal apparatus and transferred, via the first network and one of the third networks, to one of the plurality of server apparatuses, into the second packet which is transmitted, via the first network, to the second router apparatus and has a destination address corresponding to an address of the second router apparatus associated with an address of the first packet received from the terminal apparatus, based on association information;

a second processor which takes the first packet transmitted by the terminal apparatus, out from the second packet encapsulated; and a second transmitting unit which transmits the first packet taken out by the second processor to the third network connected to the first network by the second router apparatus.

9. The communication system according to claim 8, further including a server management apparatus and an address storage apparatus,
wherein the server management apparatus comprises:
a load storage unit which stores a load on the server apparatus receiving the packet transmitted from the terminal apparatus; and
a third transmitting unit which transmits a change request signal requesting a change of the destination of the packet from the terminal apparatus according to the load on the server apparatus, to a second router apparatus connecting the third network to which the server apparatus is connected to the first network,
the address storage apparatus comprises a second storage unit which stores addresses of a plurality of second router apparatuses,
the second router apparatus comprises:
a second storage unit which stores second association information associating an address of the terminal apparatus with an address of the first router apparatus;
an address inquiring unit which inquires of the address storage apparatus about the address of one of the plurality of second router apparatuses in response to the change request signal; and
a transmitting unit which transmits the address received from the address storage apparatus to the address of the first router apparatus associated, based on the association information, with the address of the terminal apparatus designated in the change request signal.

10. The communication system according to claim 8, further comprising an address storage apparatus,
wherein the address storage apparatus comprises:
a second storage unit which stores the addresses of the plurality of second router apparatuses;
a third receiving unit which receives, from a server apparatus receiving the packet transmitted from the terminal apparatus, a change request signal requesting a change of the destination of the packet from the terminal apparatus to another server apparatus of the plurality of server apparatuses;
a selecting unit which selects the address of one of the plurality of second router apparatuses in response to the change request signal; and
a third transmitting unit which transmits the address of the second router apparatus selected by the selecting unit to the first router apparatus, and
the first router apparatus comprises an address changing unit which changes an address associated with the address of the server apparatus based on the association information to an address received from the address storage apparatus.

11. The communication system according to claim 8, further including an address storage apparatus,
wherein the address storage apparatus comprises:
a second storage unit which stores the addresses of the plurality of second router apparatuses and load information on the plurality of server apparatuses;
a third receiving unit which receives, from the first router apparatus, load information on the server apparatus receiving the packet transmitted from the terminal apparatus;
a selecting unit which selects the address of one of the plurality of second router apparatuses that connects the first network to a third network connected to a server apparatus having a load lower than a value in the load information received from the first router apparatus; and
a third transmitting unit which transmits the address of the second router apparatus selected by the selecting unit to the first router apparatus, and
the first router apparatus comprises an address changing unit which changes an address associated with the address of the server apparatus based on the association information to an address received from the address storage apparatus.

12. A packet transfer method implemented in a router apparatus connecting a first network and a second network, the method comprising:
storing, in a predetermined storage unit which stores association information, the association information associates an address of one of a plurality of second router apparatuses, having different addresses from each other, with an address of a corresponding one of a plurality of server apparatuses, each of the server apparatuses is assigned the same address, where the second router apparatuses are connected, on one hand, to the first network and, on the other hand, to the server apparatuses via respective third networks;
receiving a first packet transmitted from a terminal apparatus and transferred via the first network;
encapsulating the first packet received from the terminal apparatus and transferred, via the first network and one of the third networks, to one of the server apparatuses, into a second packet which is transferred, via the first network, to one of the second router apparatuses and has a destination address corresponding to an address of that second router apparatus associated with an address of the first packet received from the terminal apparatus, based on the association information; and
transmitting the second packet encapsulated to the second router apparatus via the first network.

13. A packet transfer method implemented in a router apparatus, the method comprising:
receiving a second packet from a first router apparatus via a first network, where the first router apparatus encapsulates a first packet which is received from a terminal apparatus and transferred, via the first network, one of a plurality second routers, having different addresses with each other, and one of third networks, to one of a plurality of server apparatuses, into a second packet which is transferred, via the first network, to the one of the second router apparatus and has a destination address corresponding to an address of the router apparatus associated with an address of the first packet received from the terminal apparatus, based on association information;
taking out, from the second packet encapsulated, the first packet transmitted from the terminal apparatus connected to a second network and destined for one of the plurality of server apparatuses connected to respective third networks, each of the server apparatuses is assigned the same address; and
transmitting the taken-out packet to the third network connected to the first network by the router apparatus.

* * * * *